United States Patent
Kusumi et al.

(10) Patent No.: US 9,322,677 B2
(45) Date of Patent: Apr. 26, 2016

(54) POSITION DETECTING DEVICE

(71) Applicant: DMG MORI SEIKI CO., LTD., Nara (JP)

(72) Inventors: Masaaki Kusumi, Kanagawa (JP);
Daisuke Uchiyama, Kanagawa (JP);
Shigeru Ishimoto, Kanagawa (JP);
Yusuke Takei, Kanagawa (JP)

(73) Assignee: DMG MORI SEIKI CO., LTD., Nara (JP)

( * ) Notice: Subject to any disclaimer, the term of this patent is extended or adjusted under 35 U.S.C. 154(b) by 268 days.

(21) Appl. No.: 14/045,384

(22) Filed: Oct. 3, 2013

(65) Prior Publication Data

US 2014/0097833 A1   Apr. 10, 2014

(30) Foreign Application Priority Data

Oct. 4, 2012  (JP) ................................. 2012-222183
Oct. 2, 2013  (JP) ................................. 2013-207373

(51) Int. Cl.
*G01B 7/30* (2006.01)
*G01D 9/10* (2006.01)
*G01D 5/245* (2006.01)

(52) U.S. Cl.
CPC ................ *G01D 9/10* (2013.01); *G01D 5/2458* (2013.01)

(58) Field of Classification Search
CPC .......... G01B 7/046; G01B 5/145; G01B 7/02; G01D 9/10; G01D 5/2451–5/2458
USPC ........................... 324/207.23, 207.24, 207.25
See application file for complete search history.

(56) References Cited

U.S. PATENT DOCUMENTS

2003/0187609 A1* 10/2003 Kusumi et al. ................ 702/150

* cited by examiner

*Primary Examiner* — Daniel Miller
(74) *Attorney, Agent, or Firm* — Osha Liang LLP

(57) ABSTRACT

A position detecting device that includes a recording medium provided with a first recording track in which a non-repetitive signal composed of binary information is recorded and a second recording track in which a signal for specifying a reading section within a section of information of 1 unit for the non-repetitive signal and information reading means that includes a first detection head and a second detection head and for reading each 1 unit information of the non-repetitive signal from the first recording track by using the first detection head in the reading section within a section of information of 1 unit for the non-repetitive signal specified based upon the signal recorded in the second recording track by the second detection head.

3 Claims, 54 Drawing Sheets

POSITION DETECTING DEVICE

BACKGROUND OF THE INVENTION

1. Field of the Invention

This invention relates to a position detecting device for use in, for example, a machine tool for metal machining, an industrial machine, a robot or the like.

2. Description of the Related Art

In a main body apparatus for various machine tools, industrial robots or the like, a position detecting device for detecting the shift amount and shift position of a movable portion such as a table or the like is installed. In recent years, there are many cases in which an encoder scale of a so-called absolute type is used as the position detecting device in the industrial machines as a whole typically including the machine tools.

The encoder scale of an absolute type has such a structure that by reading non-repetitive codes recorded on the scale, the amount of mechanical displacement, as it is, is outputted as absolute positional information by using binary codes or the like. Since the encoder scale of an absolute type makes it possible to always confirm the position relative to the origin, it is not necessary to detect the origin (return to the origin) every time the power supply is turned on. Moreover, even when the detection head deviates from the scale, by returning the detection head to a predetermined position on the scale, the absolute position of the corresponding point can be obtained at once.

In the case of a linear encoder of an incremental type that has been often used conventionally, upon activating the device or upon occurrence of a trouble, it is necessary to carry out the returning process to the origin; however, the encoder scale of an absolute type is advantageous in that no returning process to the origin is required.

As the encoder scale of an absolute type, a magnetic absolute-type encoder, which generates an absolute-value-forming code by using a non-repetitive pattern (M-code pattern of an M-sequence or the like) formed by combining polarized portions and non-polarized portions of the magnetic scale with one another so that absolute data are outputted, has been known (for example, see Patent Documents 1 and 2, Japanese Patent Application Laid-Open No. 9-264760, Japanese Patent Application Laid-Open No. 2007-033245).

In the magnetic absolute-type encoder, the absolute-value-forming code is read from the magnetic scale in which the pattern codes of the absolute-value-forming code using the M-code pattern are recorded, by using magneto-resistive effect elements (MR elements).

As the magneto-resistive effect elements (MR elements), AMR elements using the Anisotropic Magneto-Resistive (AMR) effect of a ferromagnetic metal (for example, Ni—Fe film having a small saturated magnetic field, Ni—Co film having a great MR rate of change, or the like), magneto-resistive effect elements (GMR elements) using a coupling-type Giant Magneto-Resistive (GMR) effect by the use of a magnetic film composed of a multi-layer structure, etc. have been known.

In the AMR elements, an electric resistance is allowed to change by a comparatively low change in magnetic field (several Oe to several tens f Oe).

Moreover, the GMR elements have a greater rate of change in resistance in comparison with the AMR elements, and consequently make it possible to provide a better spacing characteristic and a higher output in comparison with the AMR elements. Moreover, in the magnetic film that exerts the GMR effect, since the resistance change is exerted isotropically regardless of a relative angle between the magnetic field and the electric current, by disposing a signal magnetic field from a detection subject material and the longitudinal direction of a field sensitive pattern in parallel with each other, the influences from a diamagnetic field can be reduced.

Moreover, in the case of a position detecting device in which an incremental (INC) track having S poles and N poles that are alternately placed side by side regularly and an absolute (ABS) track having absolute-value forming codes using the M-code pattern recorded thereon are used in combination, as shown in FIG. 34, [1] and [0] of the M-code to be recorded in the ABS track corresponds to 1 pitch of the INC track=1 wavelength ($\lambda$) of a reproducing signal, and in response to information of codes, "presence of record" and "absence of record" are recorded in a medium for each of INC 1 wavelength ($\lambda$).

In this case, the AMR elements can measure the absolute value of a magnetic field; however, they cannot distinguish the polarity.

That is, in the case of a detection using the AMR elements, the MR elements basically use a characteristic in which a resistance value is changed depending on the size of a magnetic field applied to an element in a direction orthogonal to the longitudinal direction of the element stripes. At this time, as long as a magnetic field is applied, regardless of the direction of the magnetic field, the resistance value is reduced from the value at the time of no magnetic field. Therefore, this method fails to distinguish the polarized direction.

In the case when the AMR elements are used, pieces of information of [1] and [0] or [H] and [L] in the respective bits of the M-code correspond to "presence of record" and "absence of record" as pieces of magnetic information.

However, when "presence of record" and "absence of record" are recorded in the medium in association with information of [1] and [0] of the M-code for each of INC 1 wavelength, the bit of "presence of record" adjacent to a bit corresponding to "absence of record" has an expanded recording width, with the result that it becomes difficult to record/reproduce a signal correctly corresponding 1 pitch of the INC track=1 wavelength of reproducing signal.

For this reason, in the case when the bit of "presence of record" adjacent to a bit corresponding to "absence of record" is formed (recorded), recording has to be carried out so as to reproduce information as correctly as possible by optimizing the recording conditions; however, such optimizing processes are not simple and also influenced by the order of sequence of codes.

For example, the conditions for optimizing are different depending on a case in which there are bits of "presence of record" on two sides, with "absence of record" being located therebetween, and a case in which there are continuous bits of "presence of record" and the bit of "absence of record" continues from the adjacent side.

In this manner, the optimizing processes need to be carried out in accordance with the positions of codes, causing very complicated optimizing processes.

Moreover, in the case when information is read out from the recording medium formed as described above, the size of a magnetic field from the medium is reduced as the distance from an MR element to the medium becomes longer; however, since the optimized recording fails to have a uniform magnetization intensity, a uniform reduction is not prepared relative to a change in distance, with the result that the reproduced waveform tends to change. Consequently, the distance range for an effective reproducing process becomes narrow and is limited.

On the other hand, in order to avoid the above-mentioned problem, a method has been proposed in which a bias magnetic field is applied in a direction orthogonal to the longitudinal direction of the MR elements so that by moving the diamagnetic field operation point to the mid point of a change, the direction of a magnetic field is distinguished (hereinafter, referred to as an operation point bias).

In this case, it is necessary to apply a uniform bias laterally onto a group of sensors for use in detecting M-codes, and since a method by the use of a bias magnet causes a defect in that a large magnet is required, resulting defects are a large-size device and high costs from the necessity of providing a long distance from the INC track located on the side thereof, or the like.

Moreover, in the case when another magnetic device other than the MR element, for example, a hole element, is used, although the above-mentioned bias is not required, it is difficult to configure a system capable of obtaining a resolution of 10 nm to sub-microns required for tool machines and industrial machines in the case of a configuration using a general-use hole element.

Furthermore, in the following description that can be applied to the magnetic type devices as a whole, in positions where the same pieces of information of [1] and [0] or [H] and [L] in the respective bits of M-codes continue successively, recording processes in the same direction, that is, polarizing processes, are carried out as many as the number of the continuous positions, with the result that the polarized region having the same continuous information is brought into a state equivalent to a structure in which a long magnet is formed. For this reason, depending on relationships between the continuous length and the spacing distance of the MR elements, as indicated by a solid line in FIG. 34, in the vicinity of the center in the longitudinal direction of the polarized region having the same continuous information, that is, the long magnet, a magnetic field applied to the MR element becomes weaker, causing a reduction in the signal and sometimes resulting in a detection error.

In the same manner, in the following description that can be applied to the magnetic type devices as a whole, in general, in the magnetic type, with respect to a series of recording pitches, since, as the spacing distance becomes larger, the intensity of the resulting magnetic field is reduced virtually exponentially in accordance with the principle of magnetism, the amount of change in the element fluctuates greatly relative to fluctuations in the spacing. For this reason, the application region is limited. Moreover, it is difficult to form a stable signal in the application region.

In view of the above-mentioned problems, the magnetic absolute scale encoder that is commercialized at present adopts AMR elements for use as machine tools and industrial machines requiring a resolution of 10 nano-level, with no operation-point bias being used.

Therefore, the binary information is dependent on the presence or absence of magnetic recording.

Moreover, on the scale side, drums and disc-shaped members having a length exceeding 4 m or various diameters are required, and from the viewpoint of costs, media having a possibility of practical use are those coated media, those alloy magnet media or the like, and any of these have an anisotropic property or an isotropic property in the longitudinal direction. No vertical media that can achieve these shapes and precision have been realized in practical use.

On the other hand, in the case of industrial apparatuses for use in transporting purposes, or the like, that do not require so much resolution and precision as described above, a rubber magnet or the like may be used as a medium even when the same MR elements are used so that a vertical magnetic medium may be practically used.

Moreover, in this system, since the bit corresponding to "presence of record" is the same regardless of polarized directions, the continuous bits can be alternately polarized. Thus, the problem in that the continuous bits cause one big magnetic pole can be solved.

At this time, in the vicinity of a position where polarized directions are changed, the magnetic field becomes weaker to form the same state as that of "absence of record" so that the resulting signal is reversed; however, as shown in FIG. 34, more ABS sensors than the number of required bits are disposed so as to correct deviations between ABS bits as well as between INC and ABS; thus, by providing such a configuration as to prevent deviations in scale as they are from forming a read error signal, the problem can be prevented.

In this method, an area for use in actually detecting the ABS corresponds to one portion in a range from 50% to 60% or the like of 1 bit length (derived from setting and designing of the detection system and a degree of additional margin) so that a stable region of a signal can be detected.

In other words, the detection output of the ABS sensor positioned in the vicinity of the position where polarized directions are changed, which is indicated by half-tone dot meshing in FIG. 36, is not utilized.

In this configuration, since the ABS track portion in the magnetic scale is dependent on the presence or absence of magnetic recording of binary information, the bit of "presence of record" adjacent to a bit corresponding to "absence of record" as described above has an expanded recording width, with the result that it becomes difficult to record/reproduce a signal correctly corresponding to 1 pitch of the INC track=1 wavelength of reproducing signal. For this reason, many problems are raised in that, for example, upon forming (recording) a bit of "presence of record" adjacent to the bit corresponding to "absence of record", recording has to be carried out so as to reproduce information as correctly as possible by optimizing recording conditions.

In the case when the operation point bias is used, a binary signal is obtained by controlling polarized directions. In this case, no non-polarized portion is located so that in comparison with the presence of non-polarized portion, it is advantageous in that a recording state and recording conditions for obtaining a more correct signal can be easily prepared. However, this configuration, as it is, causes the same polarized direction in the continuous units so that the aforementioned problems remain.

As a method for solving this problem, a system referred to as a frequency modulating system, a Bi-Phase-Space system or the like has been known as one method of digital magnetic recording.

In this system, even in the case of the same-value continuous bits, the above-mentioned problems do not occur because of flux reversal.

However, in this system, the same-value continuous bits double the recording frequency (half of the wavelength).

Therefore, the magnetic field intensity to be read by the detection sensor is reduced and the spacing characteristic deteriorates. Fluctuations in magnetic field relative to spacing become greater to cause a great signal change. Moreover, the application of this system to a scale causes a relationship in which just a double frequency is formed, and this state, as it is, causes the effective detection range in one bit to be limited to 50%, and in this case also, since the binary state is distinguished by, so to speak, the positive or negative of the signal, a problem further arises in that the effective detection range might become 50% or less in the case of occurrence of fluctuations.

The present invention has been devised in view of these circumstances, and its object is to provide a position detecting device capable of obtaining a stable recording state without using "absence of record" upon reproducing a binary signal.

Other objects of the present invention and specific advantages obtained by the present invention will become apparent from the following detailed description of the preferred embodiments of the invention.

SUMMARY OF THE INVENTION

The present invention relates to a position detecting device that is provided with: a recording medium having a first recording track in which a non-repetitive signal composed of binary information is recorded and a second recording track in which a signal for specifying a reading section within a section of information of 1 unit for the non-repetitive signal; and an information reading means for reading each 1 unit information of the non-repetitive signal from the first recording track by using a detection head in a reading section within a section of information of 1 unit for the non-repetitive signal specified based upon the signal recorded in the second recording track, and is characterized in that in the first recording track, each 1 unit information is recorded in an effective section longer than the reading section within the section of information of 1 unit for the non-repetitive signal.

In the position detecting device in accordance with the present invention, the first recording track is designed to have an invalid section which records information different from the information recorded in the effective section and is located at a border portion between sections in which non-repetitive signals composed of the same binary information are continuously recorded.

The position detecting device in accordance with the present invention may be designed so that the invalid section in which information different from the information in the effective section is recorded is shorter than the effective section.

The position detecting device in accordance with the present invention may be designed so that the recording medium is a magnetic recording medium and the information reading means detects a signal recorded in the first recording track and a non-repetitive signal recorded in the second recording track by using a magnetic detection head.

The present invention makes it possible to easily obtain a stable recording state without using "absence of record" upon reproducing a binary signal. Moreover, the same continuous signals, which form a double frequency signal, make it possible to obtain a characteristic that is superior to the spacing characteristic of an alternative magnetic field of the double frequency. Furthermore, a stable signal can be obtained within a range of 50% or more of one bit. In the above-mentioned range, it is possible to further obtain a virtually constant magnetic field intensity within the spacing region to be used.

BRIEF DESCRIPTION OF THE DRAWINGS

FIG. 10(A) shows the resulting signal with a spacing (CL) being set to 100 µm, FIG. 10(B) shows the resulting signal with the spacing (CL) being set to 200 µm, FIG. 10(C) shows the resulting signal with the spacing (CL) being set to 300 µm and FIG. 10(D) shows the resulting signal with the spacing (CL) being set to 400 µm.

FIG. 12(A) shows a state obtained with a polarized ratio (effective section:invalid section) being set to 7:3 and FIG. 12(B) shows a state in the case of using a double frequency INC signal.

FIG. 16(A) shows the resulting signal with a spacing (CL) being set to 100 µm, FIG. 16(B) shows the resulting signal with the spacing (CL) being set to 200 µm, FIG. 16(C) shows the resulting signal with the spacing (CL) being set to 300 µm and FIG. 16(D) shows the resulting signal with the spacing (CL) being set to 400 µm, in the above-mentioned position detecting device (a color drawing is presented as a reference drawing).

FIG. 19(A) shows the resulting signal with a spacing (CL) being set to 100 µm, FIG. 19(B) shows the resulting signal with the spacing (CL) being set to 200 µm, FIG. 19(C) shows the resulting signal with the spacing (CL) being set to 300 µm and FIG. 19(D) shows the resulting signal with the spacing (CL) being set to 400 µm, in the above-mentioned position detecting device (a color drawing is presented as a reference drawing).

FIG. 22(A) shows the resulting signal with a spacing (CL) being set to 100 µm, FIG. 22(B) shows the resulting signal with the spacing (CL) being set to 200 µm, FIG. 22(C) shows the resulting signal with the spacing (CL) being set to 300 µm and FIG. 22(D) shows the resulting signal with the spacing (CL) being set to 400 µm, in the above-mentioned position detecting device (a color drawing is presented as a reference drawing).

FIG. 25(A) shows the resulting signal with a spacing (CL) being set to 100 µm, FIG. 25(B) shows the resulting signal with the spacing (CL) being set to 200 µm, FIG. 25(C) shows the resulting signal with the spacing (CL) being set to 300 µm and FIG. 25(D) shows the resulting signal with the spacing (CL) being set to 400 µm, in the above-mentioned position detecting device (a color drawing is presented as a reference drawing).

FIG. 28(A) shows the resulting signal with a spacing (CL) being set to 100 µm, FIG. 28(B) shows the resulting signal with the spacing (CL) being set to 200 µm, FIG. 28(C) shows the resulting signal with the spacing (CL) being set to 300 µm and FIG. 28(D) shows the resulting signal with the spacing (CL) being set to 400 µm, in the above-mentioned position detecting device (a color drawing is presented as a reference drawing).

FIG. 31(A) shows the resulting signal with a spacing (CL) being set to 100 µm, FIG. 31(B) shows the resulting signal with the spacing (CL) being set to 200 µm, FIG. 31(C) shows the resulting signal with the spacing (CL) being set to 300 µm and FIG. 31(D) shows the resulting signal with the spacing (CL) being set to 400 µm, in the above-mentioned position detecting device (a color drawing is presented as a reference drawing).

DETAILED DESCRIPTION OF THE PREFERRED EMBODIMENTS

Referring to Figs., the following description will discuss specific embodiments of the present invention in detail.

Figure 1:
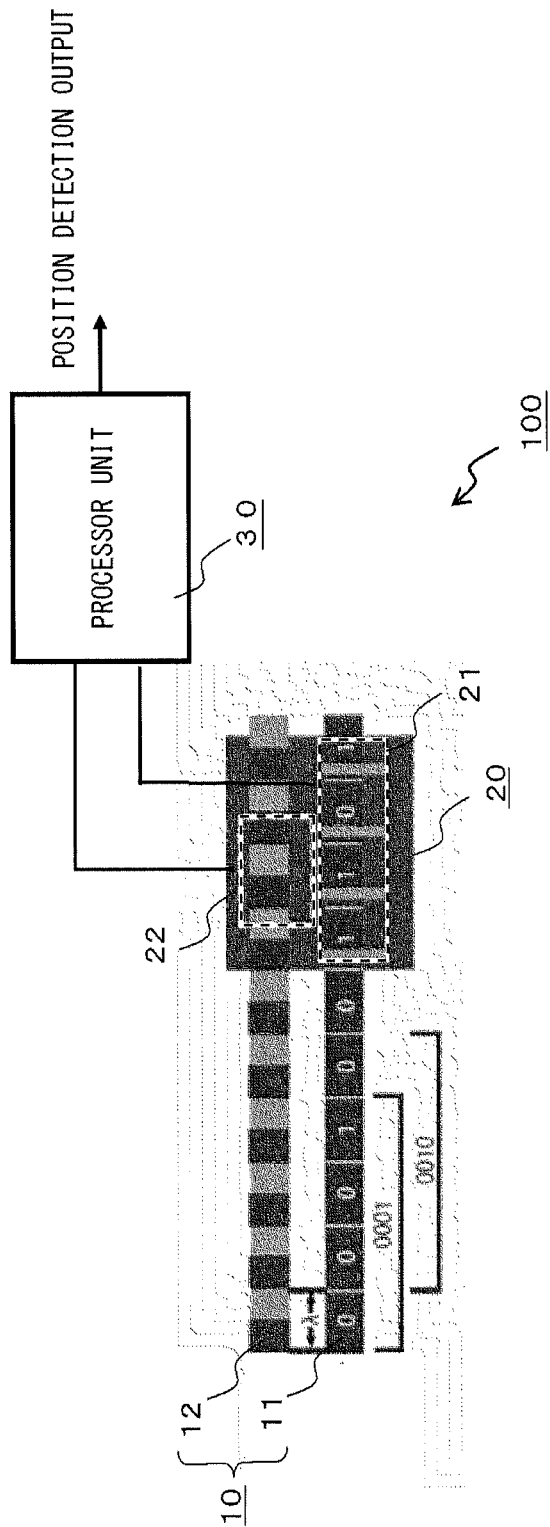
FIG. 1 is a block diagram showing a structure of a position detecting device to which the present invention is applied.

The present invention is applied to a position detecting device 100 having, for example, a configuration as shown in FIG. 1.

This position detecting device 100 is constituted by a scale unit 10, a head unit 20 and a processor unit 30.

The scale unit 10 is provided with an absolute (ABS) track 11 in which an M-code pattern (absolute pattern) indicating the absolute value in a measuring direction is magnetically recorded, and an incremental (INC) track 12 corresponding to S poles and N poles that are alternately placed regularly along the measuring direction.

Figure 2:
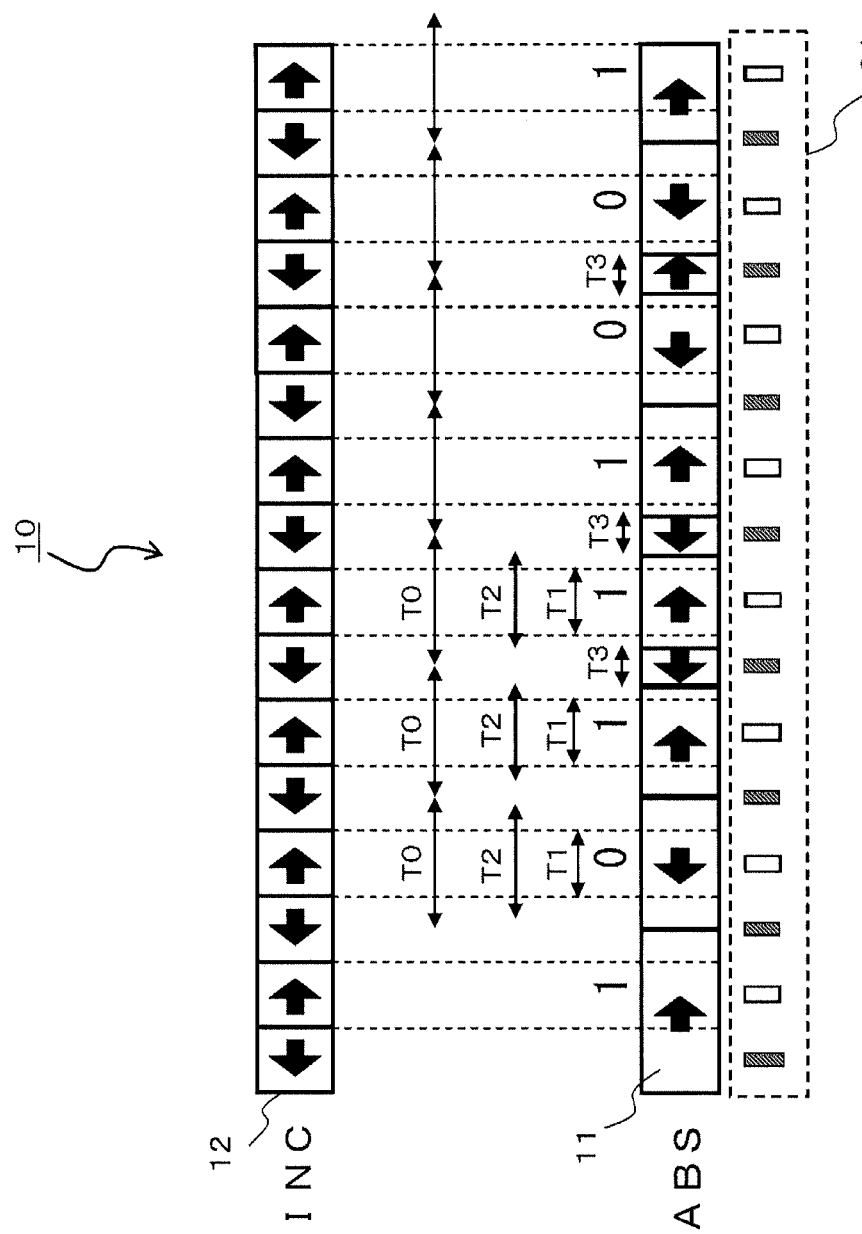
FIG. 2 is a schematic plan view showing a structural example of an incremental (INC) track and an absolute (ABS) track of a scale unit in the above-mentioned position detecting device.

In this case, in the position detecting device 100, as shown in FIG. 2, the absolute (ABS) track 11 of the scale unit 10 is a first recording track in which non-repetitive signals composed of binary information are recorded as the M-code pattern (absolute pattern) indicating the absolute value in the measuring direction, and the incremental (INC) track 12 of the scale unit 10 is a second recording track (INC) in which a signal specifying a reading section (T1) within a section (T0) of information of 1 unit for the non-repetitive signals is recorded. In the first recording track, that is, the absolute (ABS) track 11, each 1 unit information is recorded in an effective section (T2) that is longer than the reading section (T1) within the section (T0) of information of 1 unit for the non-repetitive signal.

The largest magnetization length in the absolute (ABS) track 11 is one bit that corresponds to the section (T0) of information of 1 unit for the non-repetitive signal, which is equal to 1 wavelength ($\lambda$) of the incremental signal corresponding to one pitch of the incremental (INC) track 12 in which S poles and N poles are alternately placed regularly in parallel with each other.

Moreover, the absolute (ABS) track 11 of the scale unit 10 in the position detecting device 100 allows [1] and [0] of the M-code pattern to be indicated by magnetization directions, and is provided with an invalid section (T3) which has information different from the information recorded in the effective section (T2) and is located at a border portion between sections in which non-repetitive signals formed by the same binary information are continuously recorded.

The invalid section (T3) in which information different from the information of the effective section (T2) is recorded is shorter than the effective section (T2). In this case, the ratio between the effective section (T2) and the invalid section (T3) is set to 7:3.

The absolute (ABS) track 11 having this configuration is prepared by magnetically recording, for example, the M-code pattern (absolute pattern) with 16 bits indicating the absolute value of the measuring direction as shown in FIG. 2, as a magnetization pattern in which magnetization inversions are alternately repeated along the measuring directions.

Figure 3:
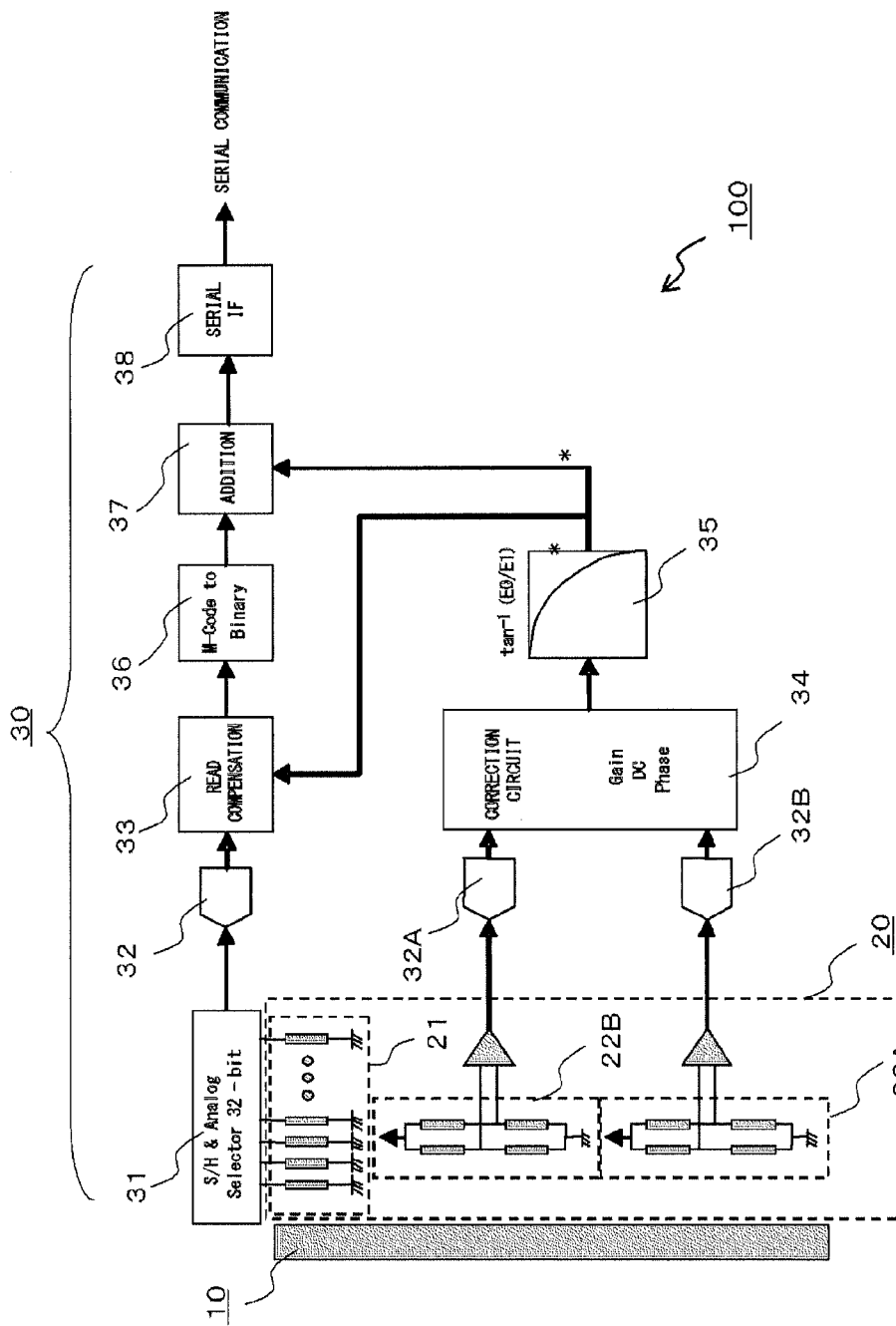
FIG. 3 is a block diagram showing a structural example of a signal processing unit in the above-mentioned position detecting device.

Moreover, as shown in FIG. 3, the head unit 20 is provided with an absolute pattern detection head 21 composed of a plurality of MR detection elements for use in detecting the absolute pattern from the absolute track 11 of the scale unit 10 and two incremental signal detection heads 22A and 22B for use in detecting the incremental signal from the increment track 12 of the scale unit 10.

In this case, the absolute pattern detection head 21 is configured such that the MR detection elements the number of which is two times as many as the number of bits of the M-code pattern (absolute pattern) indicating the absolute value in the measuring direction are disposed with a ½ interval of one bit.

The above-mentioned head 20 functions as an information reading means that detects the incremental (INC) signal recorded in the increment track 12 of the scale unit 10 by using the incremental signal detection heads 22A and 22B, and in a reading section within a section of information of 1 unit for the non-repetitive signal, that is, the M-code signal, specified based upon the detected incremental (INC) signal, reads each 1 unit information of the M-code signal from the absolute track 11 by the use of the absolute pattern detection head 21.

Moreover, in the position detecting device 100, the processor unit 30 whose structural example is shown in a block diagram of FIG. 3 is constituted by an S/H & analog selector 31, A/D converters 32, 32A and 32B, a reading compensation unit 33, a correction circuit 34, a look-up table 35, an M-code conversion unit 36, an addition unit 37, a serial interface unit 38, and the like.

To the S/H & analog selector 31, the absolute pattern detection head 21 composed of a plurality of MR detection elements for detecting the absolute pattern from the absolute track 11 of the scale unit 10 is connected.

The S/H & analog selector 31 sample-holds the respective detection outputs obtained by the plural MR detection elements of the absolute pattern detection head 21, and outputs an analog signal corresponding to the M-code pattern of 16 bits.

An analog signal corresponding to the M-code pattern of 16 bits selected by the S/H & analog selector 31 is converted to a digital signal by the A/D converter 32.

Moreover, the two incremental signal detection heads 22A and 22B for use in detecting incremental signals from the increment track 12 of the scale unit 10 are connected to the A/D converters 32A and 32B.

The INC signals obtained as detection outputs by the two incremental signal detection heads 22A and 22B are a sin signal ($\sin(X2\pi/\lambda)$) and a cos signal ($\cos(X2\pi/\lambda)$) with a $\lambda$, cycle, and converted to digital signals by the A/D converters 32A and 32B and inputted to the correction circuit 34.

In the correction circuit 34, corrections for gain, offset, phase, etc. are carried out on the INC signal detection outputs obtained by the two incremental signal detection heads 22A and 22B, and by reference to the look-up table 35, positional information converted to have a high resolution is calculated and obtained, and the positional information thus calculated is inputted to the reading compensation unit 33 and the addition unit 37.

In the position detecting device 100, based upon the positional information derived from the look-up table 35 and outputted from the reading compensation unit 33, a sensor signal located in the reading section (T1) of the M-code pattern of digital signals converted by the A/D converter 32 is selected.

The detection signal of the M-code pattern that has been read and compensated by the reading compensation unit 33 is converted from the M-code signal to a binary signal by the M-code conversion unit 36, and supplied to the adder 37.

The adder 37 outputs information obtained by combining the binary signal indicating the absolute value in the measuring direction supplied from the M-code conversion unit 36 with the positional information converted to have a high resolution and obtained from the INC signal by the compensation circuit 34 through the serial interface unit 38 as a position detection output by the position detecting device 100.

In this case, as the MR elements forming the absolute pattern detection head 21 for use in detecting the M-code pattern in the position detecting device 100, for example, AMR elements utilizing the anisotropic magneto-resistive effect (AMR) of a ferromagnetic material, GMR elements utilizing the giant magneto-resistive effect (GMR) that generates a great rate of change in resistivity by the use of a laminated structure between a ferromagnetic material and a non-magnetic material, TMR elements utilizing the tunnel magneto-resistive effect (TMR) that generates a different electric resistance value of an element depending on a relative angle of a magnetization direction of a pair of magnetic layers stacked with a non-magnetic insulating layer interposed therebetween and the like can be used.

Figure 4:
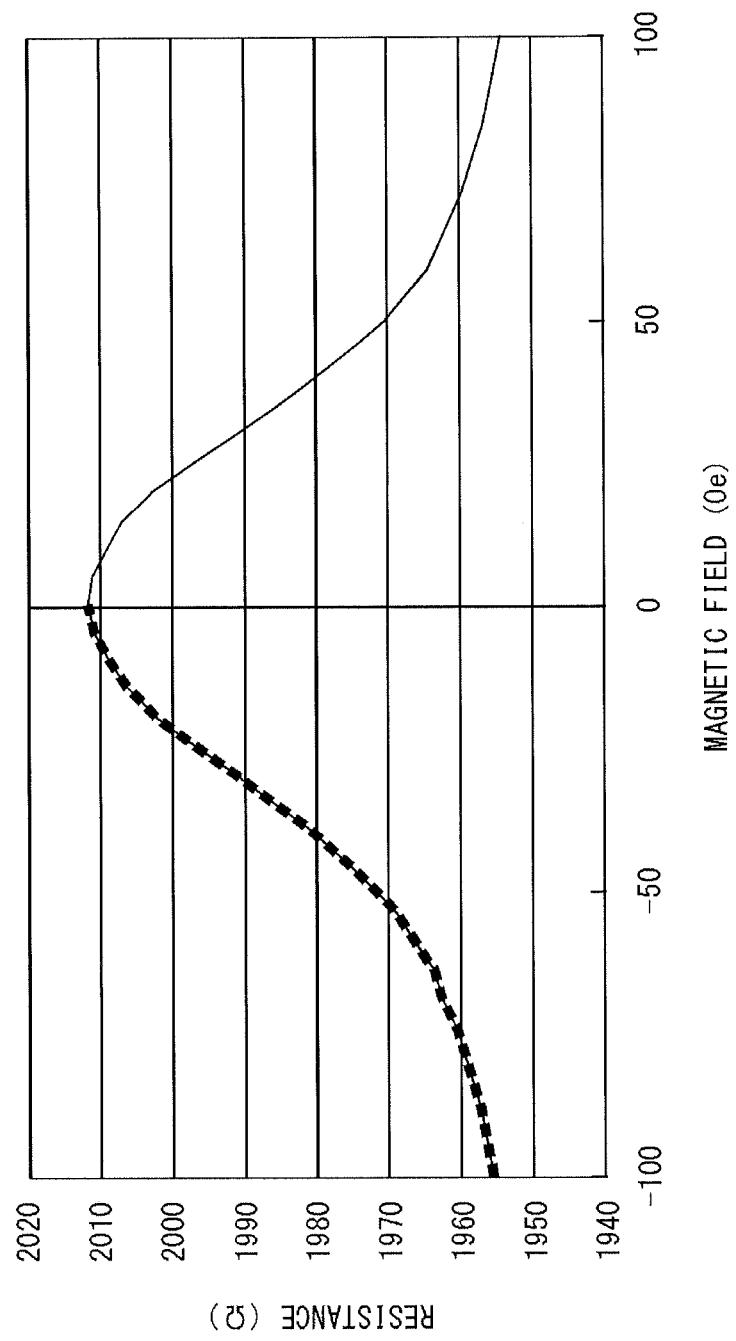
FIG. 4 is a characteristic drawing that shows a magnetic characteristic of an AMR element installed in a head unit in the above-mentioned position detecting device.

With respect to a general-use MR sensor for use in the position detecting device, in the case when the absolute pattern detection head 21 to be installed in the head unit 20 of the position detecting device 100 is constituted by the AMR elements or the GMR elements, since the AMR elements or the GMR elements, whose magnetic characteristics are shown in FIG. 4, cause a change in resistivity only in response to the magnetic field intensity, it is possible to distinguish the direction of a magnetic field by moving a non-magnetic field operation point with a bias magnetic field being applied from the outside, and consequently to detect information of [1] and [0] of the M-code pattern from the absolute (ABS) track 11 in which the [1] and [0] of the M-code pattern are recorded so as to be indicated by the magnetization directions, as described earlier.

Figure 5:
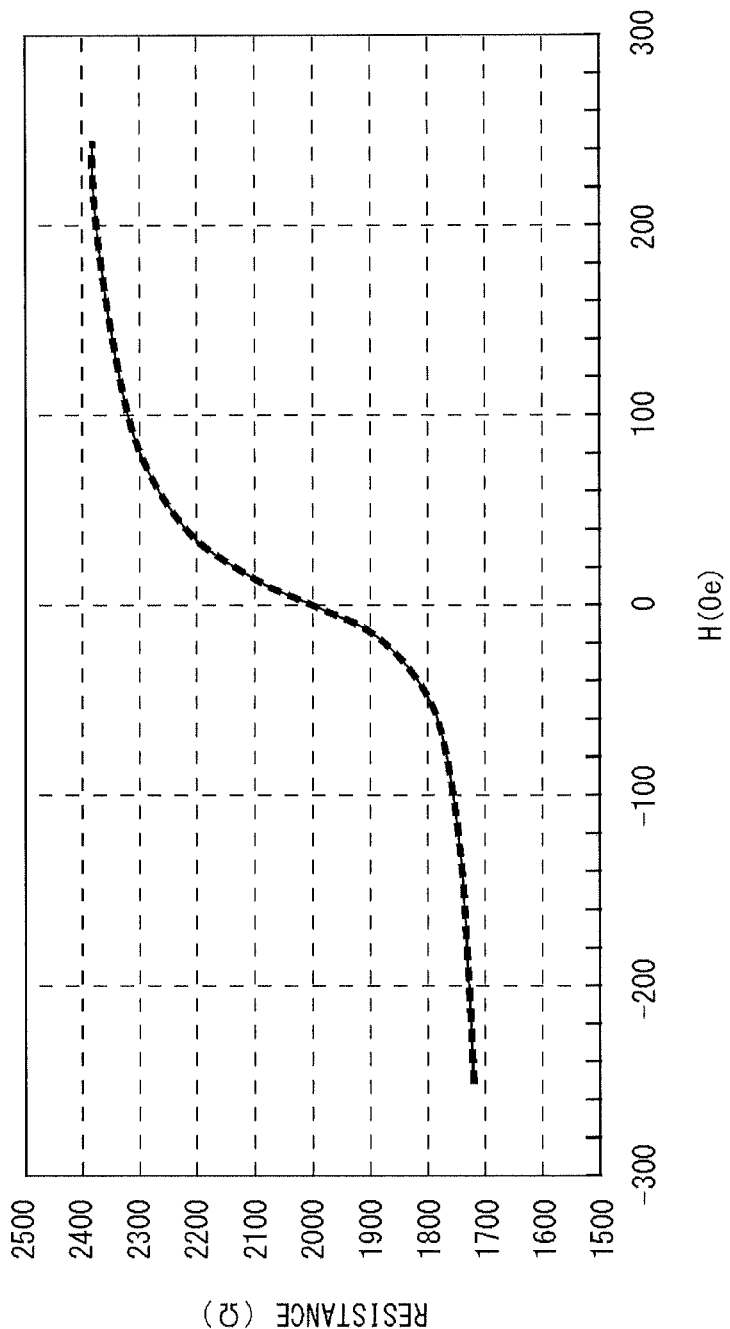
FIG. 5 is a characteristic drawing showing a magnetic characteristic of a TMR element installed in the head unit in the above-mentioned position detecting device.

In the case when the absolute pattern detection head 21 to be installed in the head unit 20 of the position detecting device 100 is constituted by the TMR elements, since the TMR elements, whose TMR magnetic characteristics are shown in FIG. 5, make it possible to easily configure the elements so as to exert such a characteristic as to change a direction in its output change depending on the positive or negative magnetic field, it becomes possible to distinguish the direction of a magnetic field without the necessity of applying a bias magnetic field from the outside, and consequently to detect information of [1] and [0] of the M-code pattern from the absolute (ABS) track 11.

Additionally, by forming the absolute pattern detection head 21 by the GMR elements or TMR elements, it becomes possible to increase the resistance change ratio (MR ratio) relative to the external magnetic field and also to obtain the linearity of the resistance change ratio (MR ratio) so that an external magnetic field detecting process with high precision can be carried out.

Next, in the above-mentioned position detecting device 100, in the case when a polarized ratio (effective section: invalid section) is set to 7:3 in a region having the same information in the respective bits of the M-code recorded in the absolute (ABS) track 11 in the scale unit 10, that is, in a region with [1] or [0] continuously recorded, supposing that the absolute (ABS) track 11 is formed by a recording medium with Br=4000 and Hc 500, states of magnetic fields (A1, A2, A3 and A4) detected by the absolute pattern detection head 21 at the respective spacings (CL=100, 200, 300 and 400) are magnetic-field analyzed, and the results are shown in FIGS. 6 to 9, together with the results of magnetic-field analyses carried out on states of magnetic fields (B1, B2, B3 and B4) in the case when the above-mentioned region having the same information continuously recorded is prepared as one long magnet.

Figure 6:
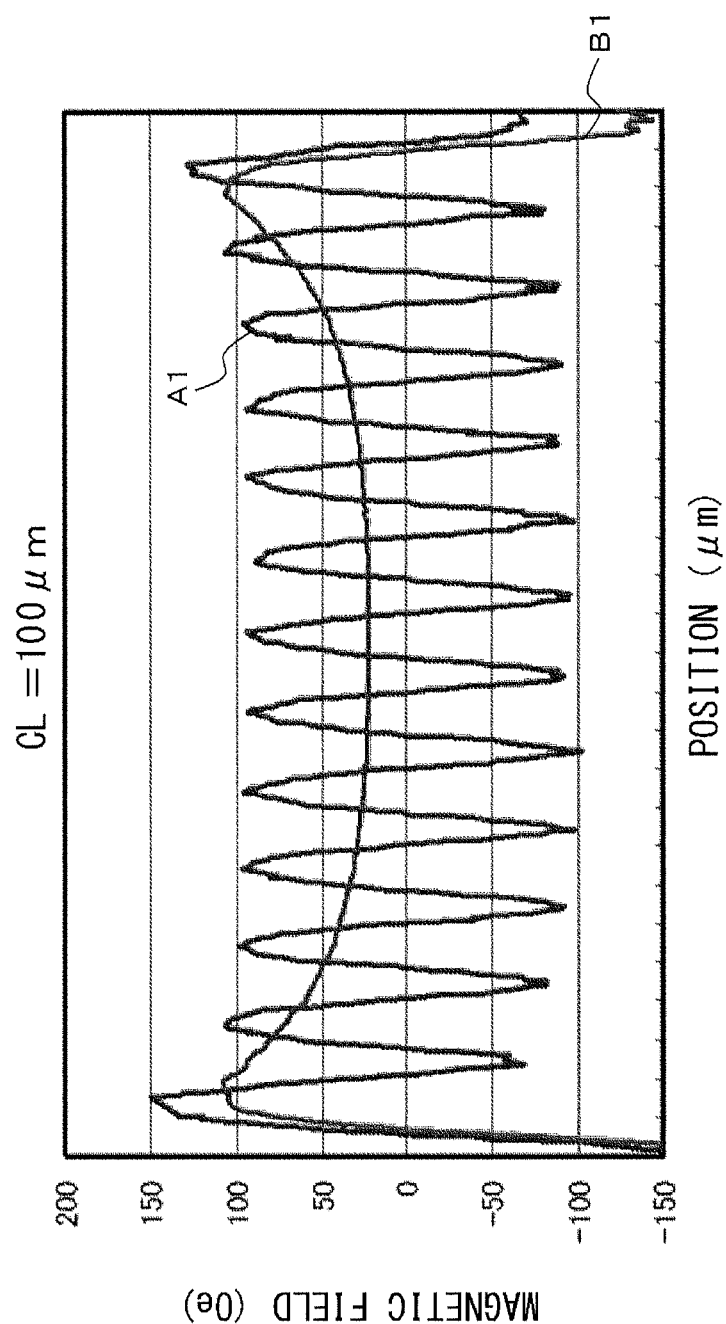
FIG. 6 is a drawing that shows a result of a magnetic field analysis of a detection output carried out supposing that a polarized ratio (effective section:invalid section) is 7:3 and that a spacing (CL) is 100 µm in the scale unit of the position detecting device.

FIG. 6 shows a magnetic field A1 detected by the absolute pattern detection head 21 in the case when the spacing (CL) is set to 100 μm, together with a magnetic field B1 detected in the case of using the long magnet, in the above-mentioned position detecting device 100.

Figure 7:
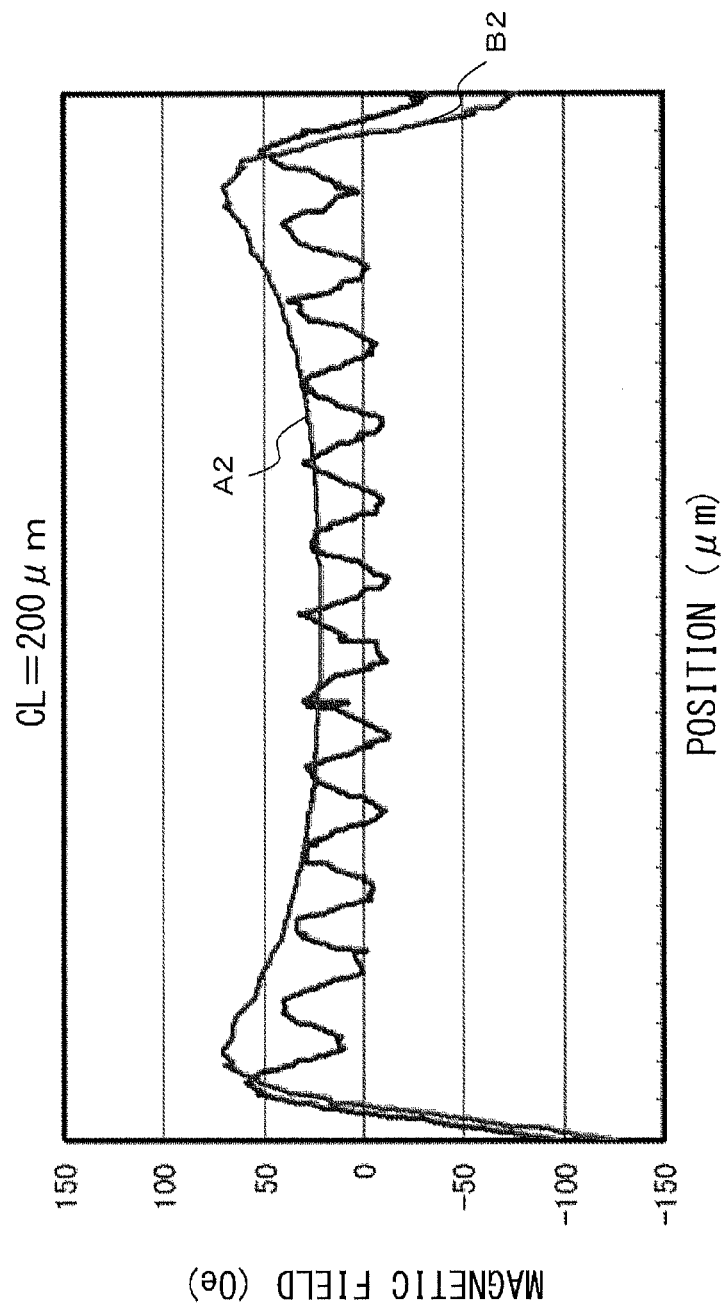
FIG. 7 is a drawing that shows a result of a magnetic field analysis of a detection output carried out supposing that a polarized ratio (effective section:invalid section) is 7:3 and that a spacing (CL) is 200 µm in the scale unit of the position detecting device.

FIG. 7 shows a magnetic field A2 detected by the absolute pattern detection head 21 in the case when the spacing (CL) is set to 200 μm, together with a magnetic field B2 detected in the case of using the long magnet, in the above-mentioned position detecting device 100.

Figure 8:
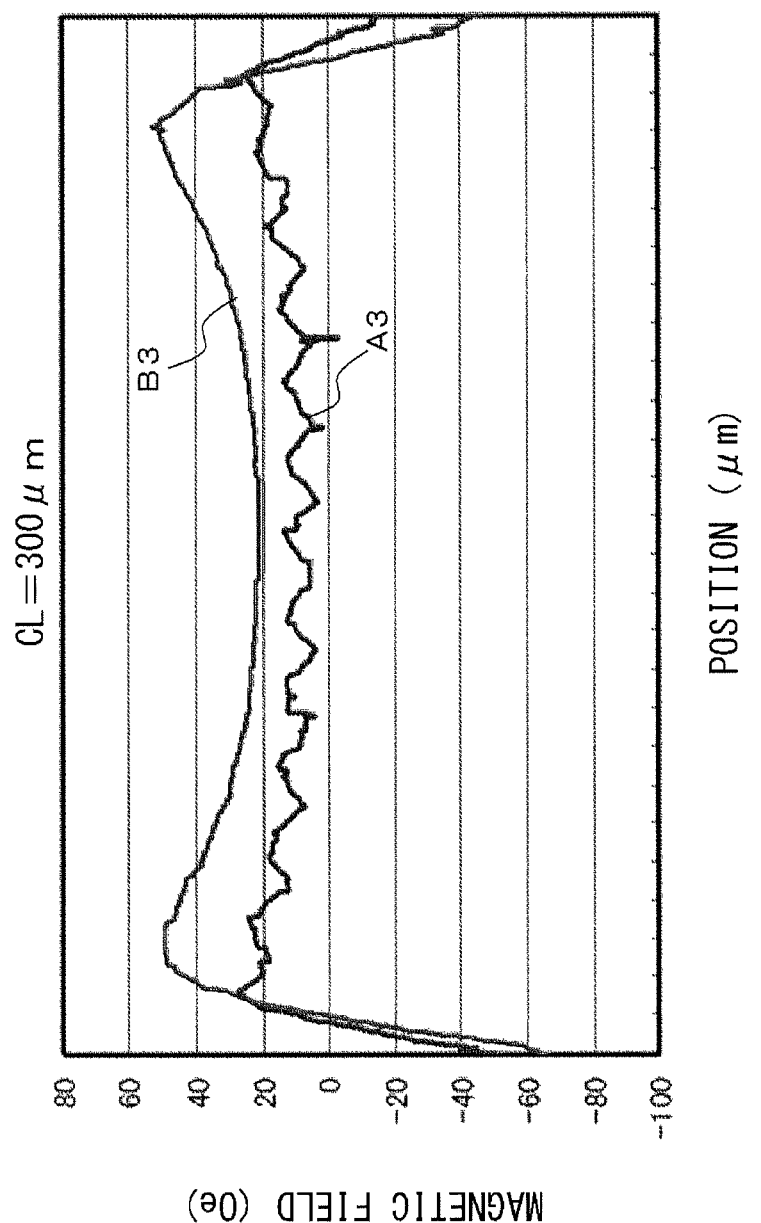
FIG. 8 is a drawing that shows a result of a magnetic field analysis of a detection output carried out supposing that a polarized ratio (effective section:invalid section) is 7:3 and that a spacing (CL) is 300 µm in the scale unit of the position detecting device.

FIG. 8 shows a magnetic field A3 detected by the absolute pattern detection head 21 in the case when the spacing (CL) is set to 300 μm, together with a magnetic field B3 detected in the case of using the long magnet, in the above-mentioned position detecting device 100.

Figure 9:
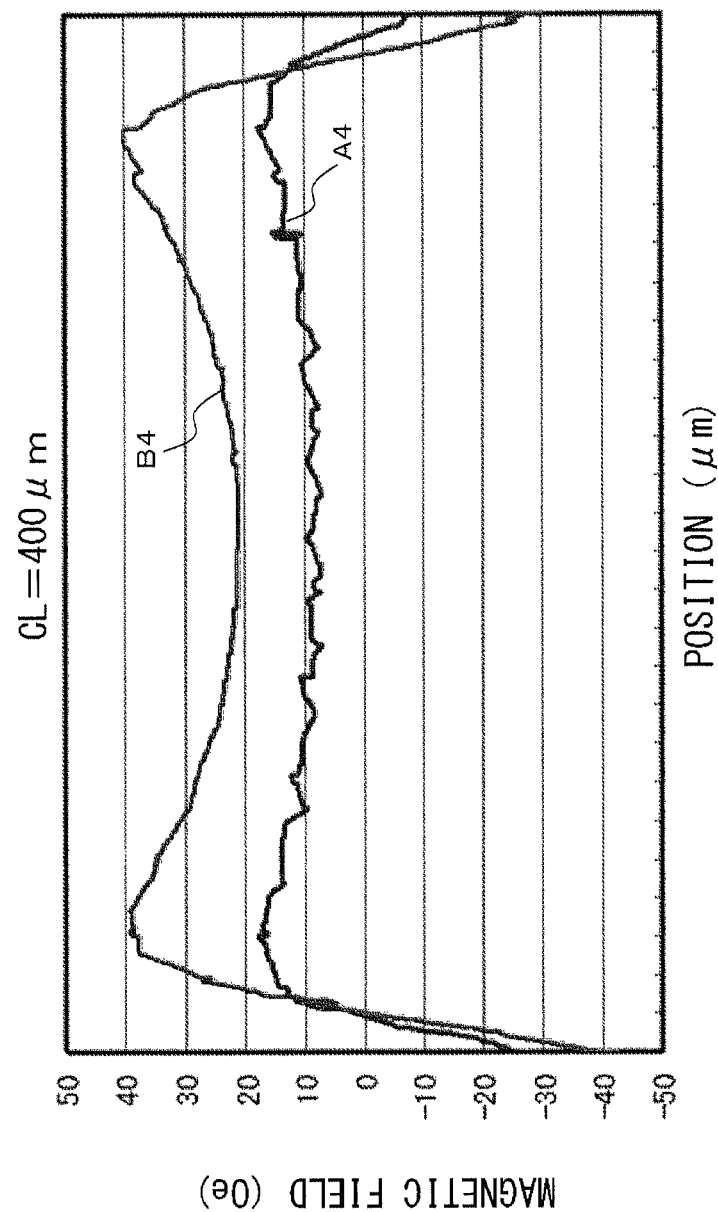
FIG. 9 is a drawing that shows a result of a magnetic field analysis of a detection output carried out supposing that a polarized ratio (effective section:invalid section) is 7:3 and that a spacing (CL) is 400 µm in the scale unit of the position detecting device.

FIG. 9 shows a magnetic field A4 detected by the absolute pattern detection head 21 in the case when the spacing (CL) is set to 400 μm, together with a magnetic field B4 detected in the case of using the long magnet, in the above-mentioned position detecting device 100.

As clearly indicated by FIG. 6 and FIG. 7, in the above-mentioned position detecting device 100, in the case when the spacing (CL) is 100 μm or 200 μm, each of the magnetic fields A1 and A2 detected by the absolute pattern detection head 21 makes it possible to provide a desirable detection output in the center portion in comparison with the magnetic field B1 in the case of using the long magnet.

Figure 10A:
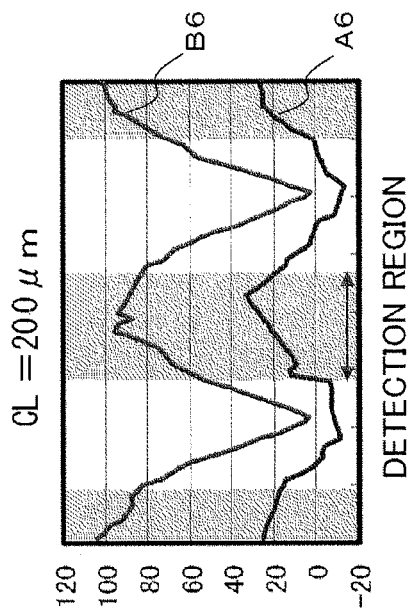
FIGS. 10(A), 10(B), 10(C) and 10(D) are drawings, each showing a center portion of continuous signals obtained in the case of a polarized ratio (effective section:invalid section) of 7:3 in comparison with a double frequency INC signal (absolute value) in the scale unit of the above-mentioned position detecting device.
Figure 10B:
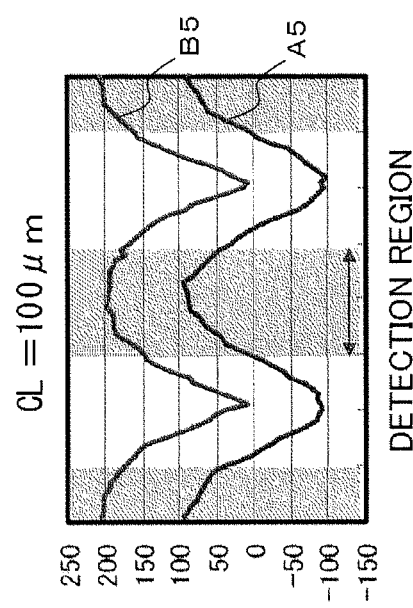
Figure 10C:
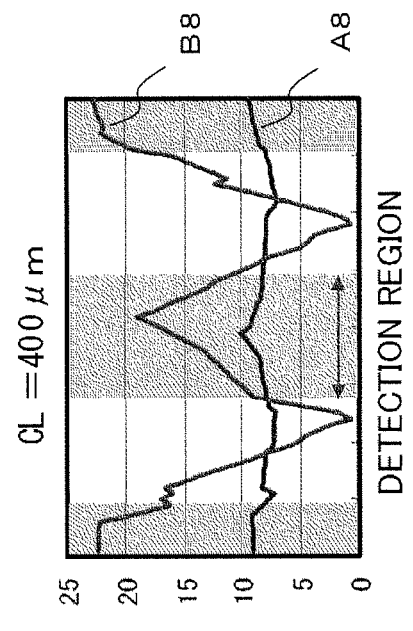
Figure 10D:
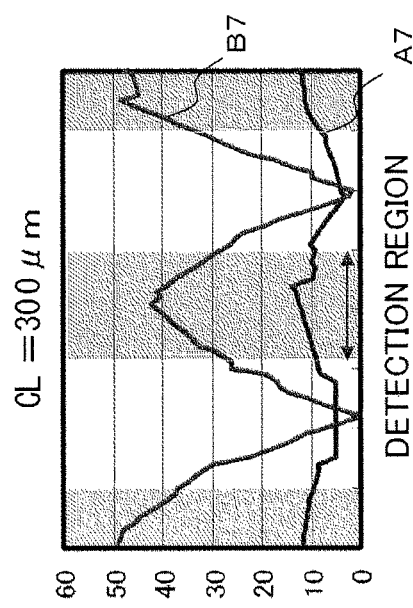

Moreover, in the above-mentioned position detecting device 100, states of magnetic fields (A5, A6, A7 and A8) in the center portion of each of the regions with the same continuously recorded information detected by the absolute pattern detection head 21 at the respective spacings (CL=100 μm, 200 μm, 300 μm and 400 μm) are magnetic-field analyzed, and the results are shown in FIGS. 10(A) to 10(D), together with the results of magnetic-field analyses carried out on states of magnetic fields (B5, B6, B7 and B8) of double frequency incremental (INC) signals (absolute value). FIG. 10(A) shows the resulting signal with a spacing (CL) being set to 100 μm, FIG. 10(B) shows the resulting signal with the spacing (CL) being set to 200 μm, FIG. 10(C) shows the resulting signal with the spacing (CL) being set to 300 μm and FIG. 10(D) shows the resulting signal with the spacing (CL) being set to 400 μm.

Figure 11:
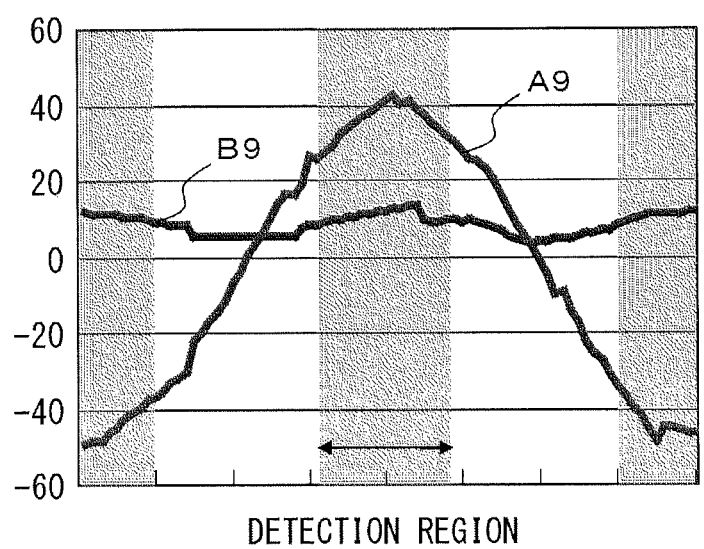
FIG. 11 is a drawing that shows a detection position for a spacing characteristic.
Figure 12A:
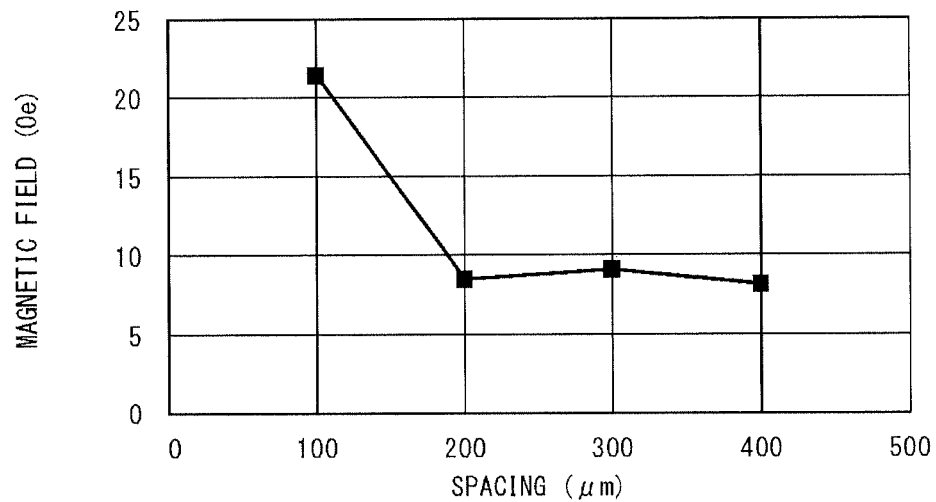
FIGS. 12(A) and 12(B) are drawings that show spacing characteristics detected by using the method shown in FIG. 10.

In the above-mentioned position detecting device 100, in the case of the respective spacings of (CL=100 μm, 200 μm, 300 μm and 400 μm), the minimum magnetic field in the detection region of the magnetic field A9 in the center portion of the two end positions of the detection regions shown in FIG. 11, that is, the regions with the same continuously recorded information detected by the aforementioned absolute pattern detection head 21, becomes virtually a constant value at the respective spacings (CL=200 μm, 300 μm and 400 μm) as shown in FIG. 12(A).

Figure 12B:
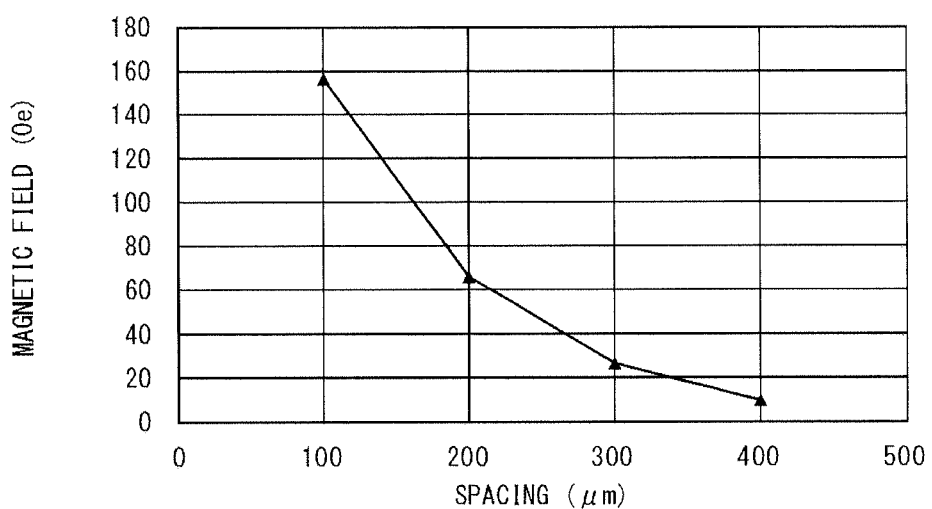

In contrast, at the two end positions of the detection regions shown in FIG. 11, a magnetic field (B9) of the double frequency incremental (INC) signal (absolute value) detected by the absolute pattern detection head 21 becomes a greatly fluctuated value at the respective spacings (CL=100 μm, 200 μm, 300 μm and 400 μm), as shown in FIG. 12(B).

That is, in the above-mentioned region with the same continuously recorded information of the absolute (ABC) track 11 in the above-mentioned position detecting device 100, the minimum magnetic field in the center portion of the detection region of the magnetic field A9 of the region with the same continuously recorded information detected by the absolute pattern detection head 21 provides a characteristic superior to the spacing characteristic of an alternative magnetic field of the double frequency. Moreover, a stable signal can be obtained within a range of 50% or more of one bit, and in the above-mentioned range, it is possible to further obtain a virtually constant magnetic field intensity within the spacing region to be used.

Figure 13:
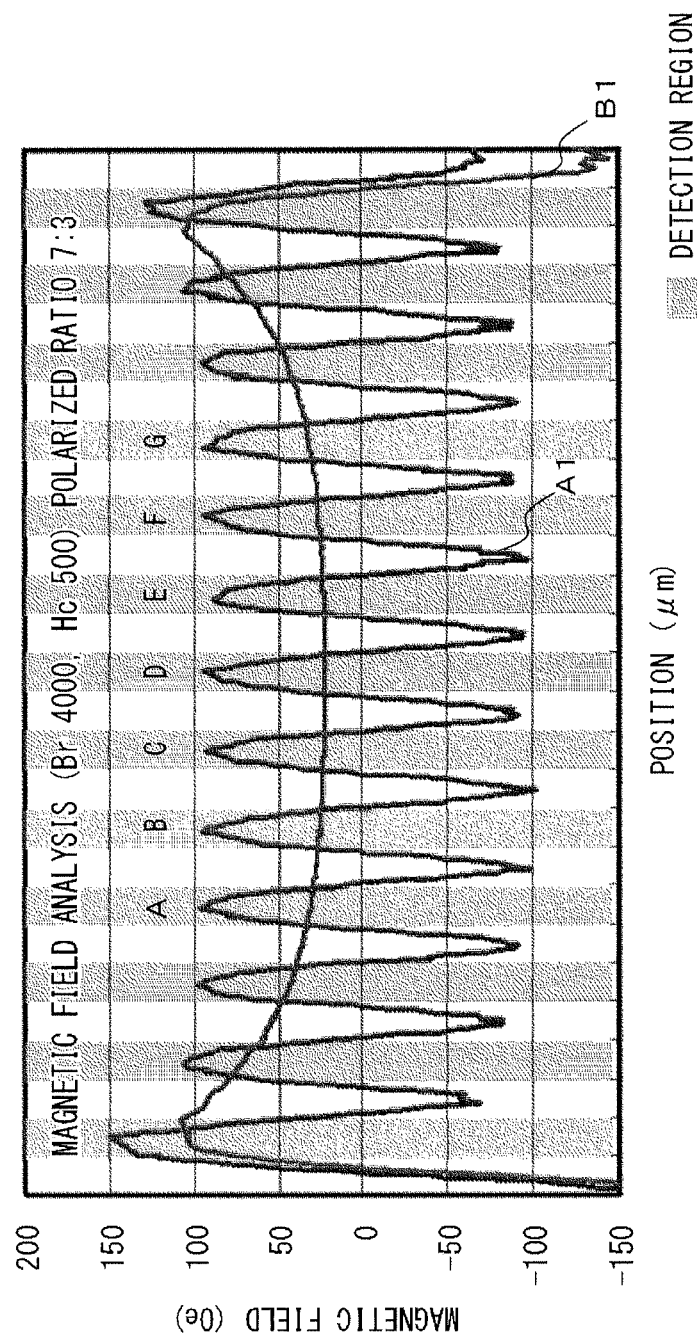
FIG. 13 is a drawing that shows seven detection regions (A to G) obtained by carrying out magnetic field analyses, with the polarized ratio (effective section:invalid section) in the scale unit being altered between 5:5 to 10:0, so as to examine influences of the spacing in the above-mentioned position detecting device.

Furthermore, in the above-mentioned position detecting device 100, with the polarized ratio (effective section:invalid section) being changed between 5:5 to 10:0 in the region with the same continuously recorded information in the scale unit 10, magnetic field analyses are carried out and changes in the minimum magnetic field by the spacing (CL) in seven detection regions (A to G) shown in FIG. 13 are confirmed; thus, results shown below are obtained.

Figure 14:
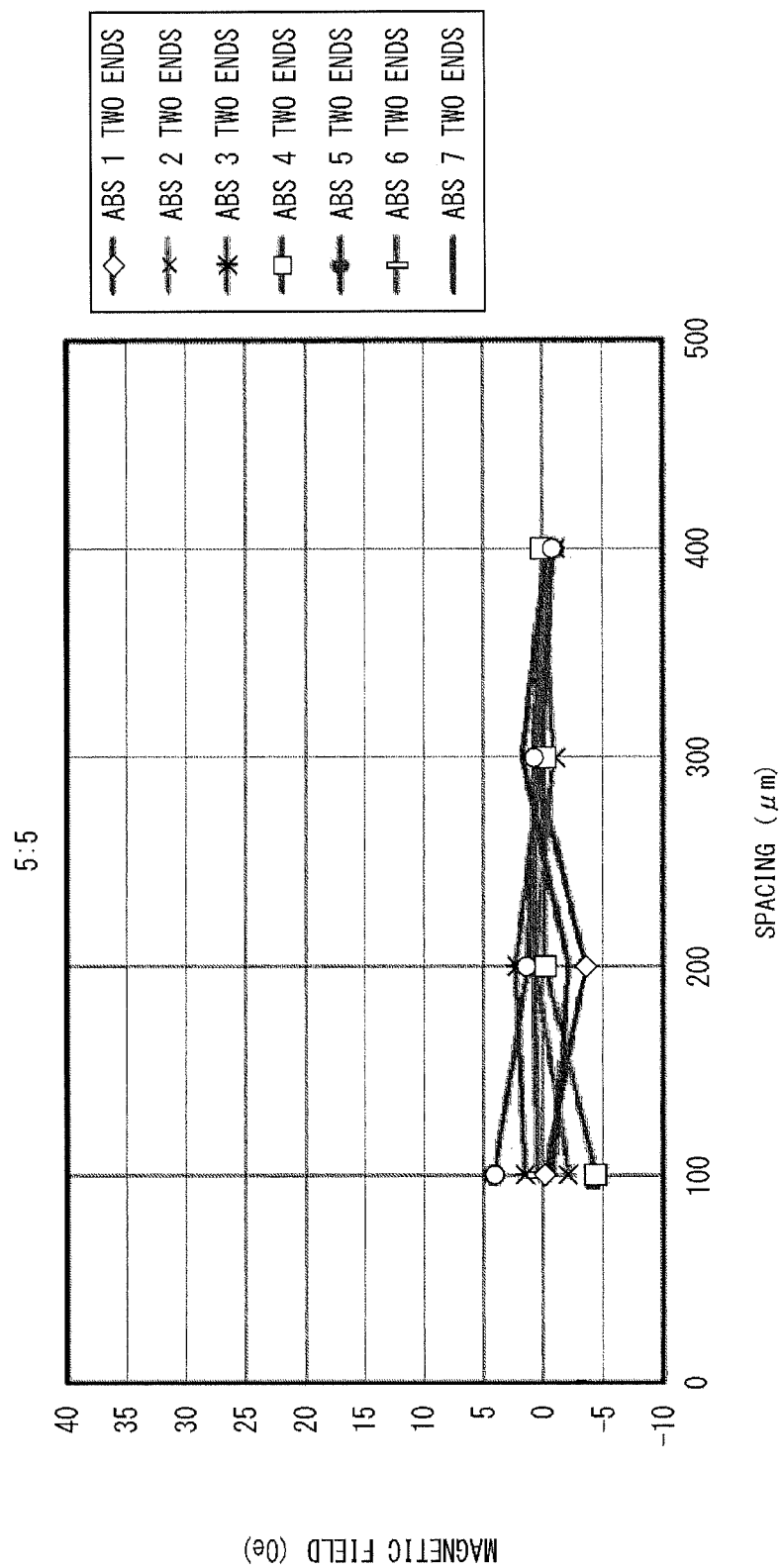
FIG. 14 is a drawing that shows a magnetic field between two ends of each of the seven detection regions (A to G), with the polarized ratio (effective section:invalid section) in the scale unit being set to 5:5 and with the spacings (CL) being set to 100 µm, 200 µm, 300 µm and 400 µm, in the above-mentioned position detecting device.

In other words, with respect to the magnetic field in the center portion of the region with the same continuously recorded information, in the case of setting the polarized ratio (effective section:invalid section) to 5:5, when the minimum magnetic field detected by the absolute pattern detection head 21 at the two end positions of the two ends of each of the seven detection regions (A to G) is plotted for each of spacings (CL=100 μm, 200 μm, 300 μm and 400 μm), each of the values becomes 0 or a negative value as shown in FIG. 14, with the result that the M-code information might be erroneously detected.

Figure 15:
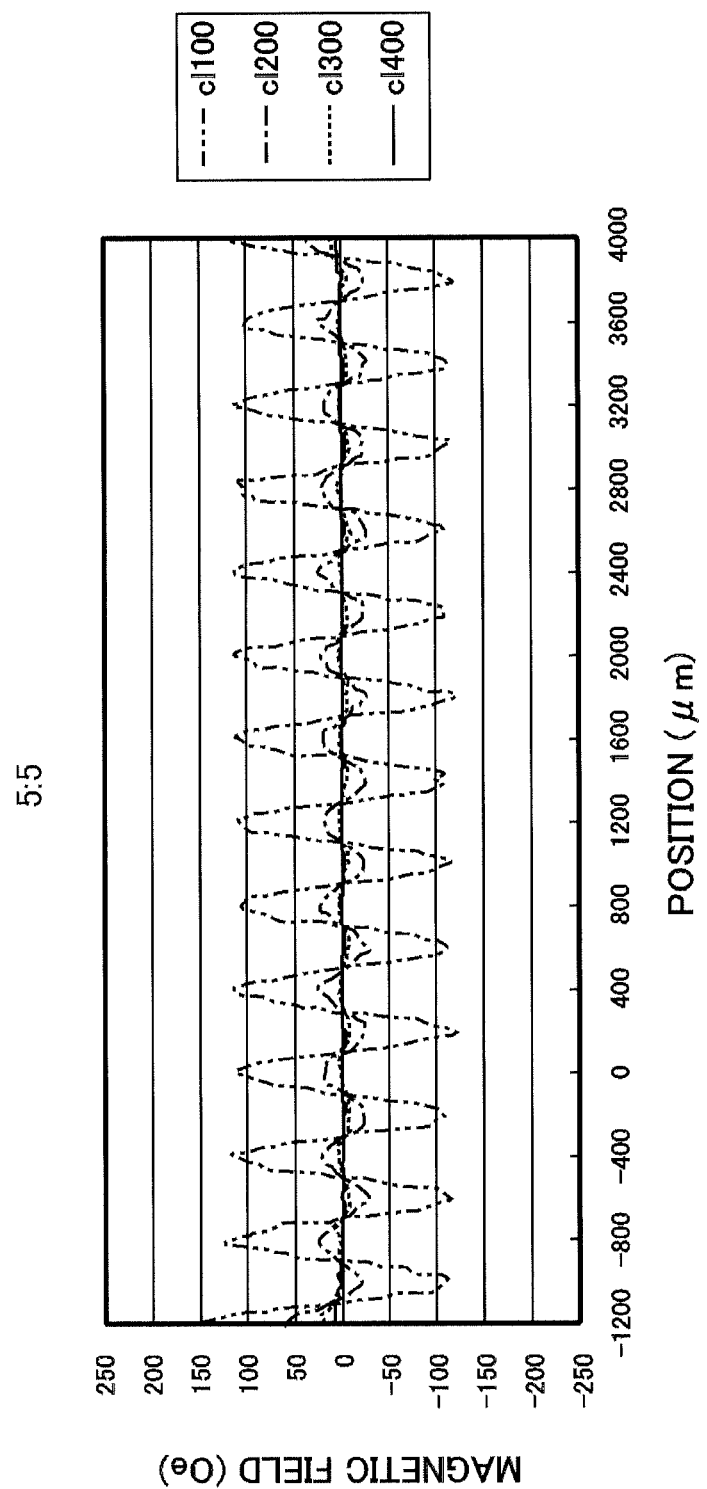
FIG. 15 is a drawing that shows an output magnetic field from a continuous recording unit obtained by magnetic field analyses, with the polarized ratio (effective section:invalid section) in the scale unit being set to 5:5, at the respective spacings (CL=100 µm, 200 µm, 300 µm and 400 µm) in the above-mentioned position detecting device.
Figure 16A:
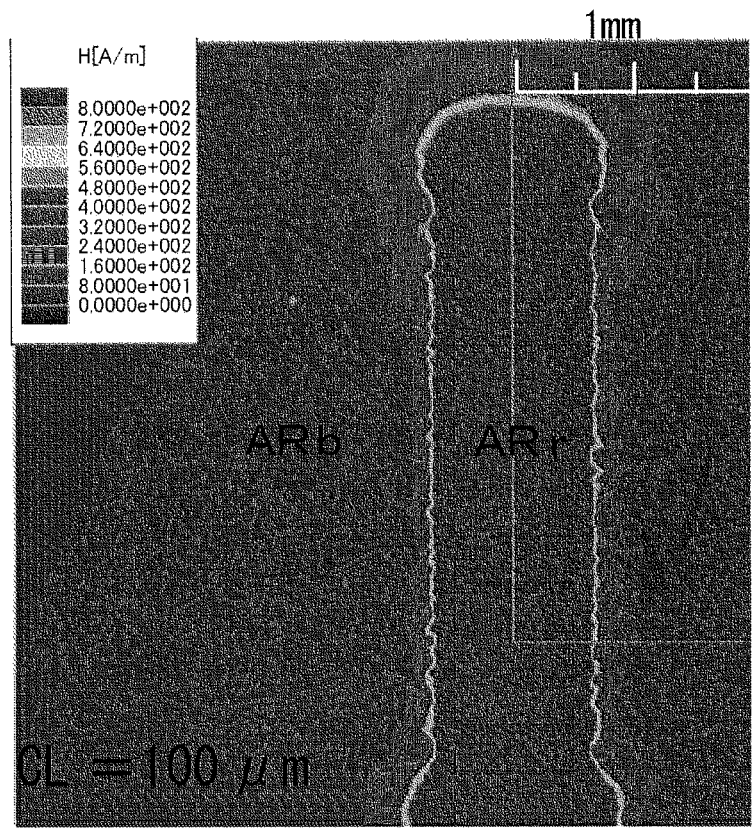
FIGS. 16(A), 16(B), 16(C) and 16(D) are drawings, each showing a magnetic field intensity distribution over a recording track and a peripheral portion thereof at each of spacings (CL) obtained by magnetic field analyses, with the polarized ratio (effective section:invalid section) in the scale unit being set to 5:5.
Figure 16B:
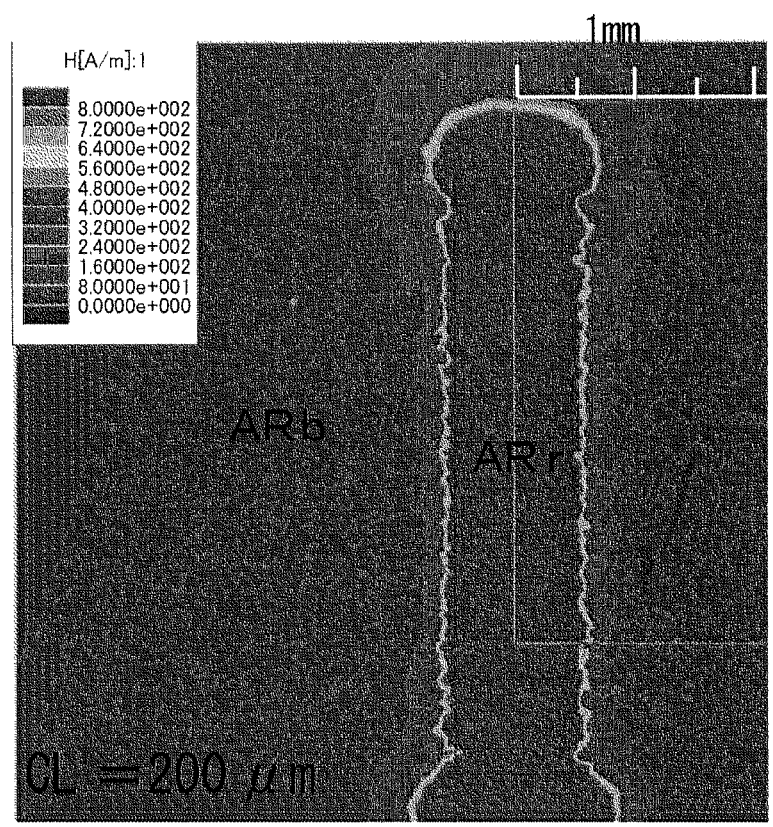
Figure 16C:
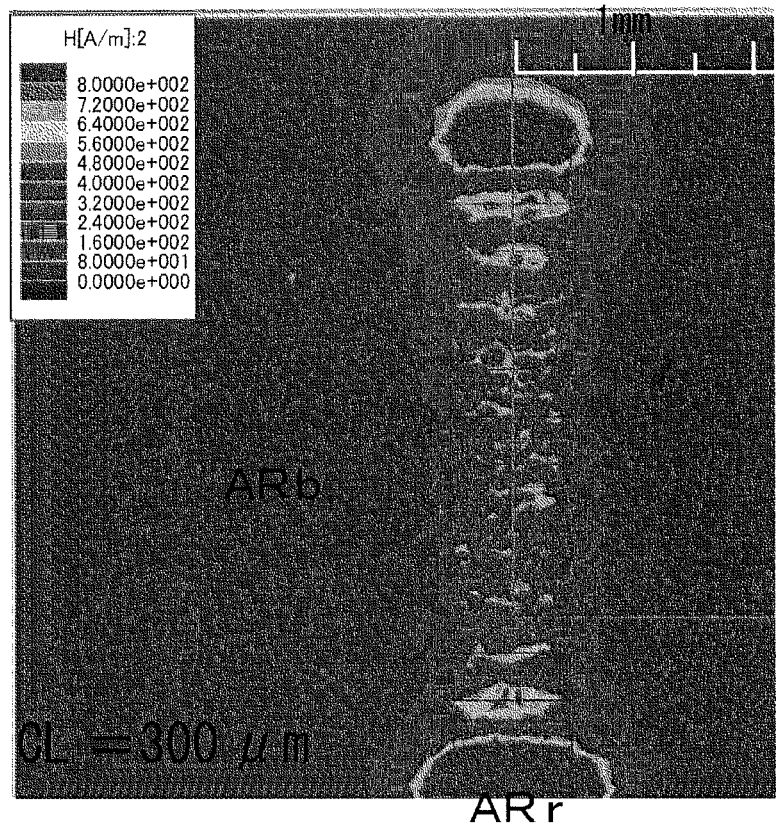
Figure 16D:
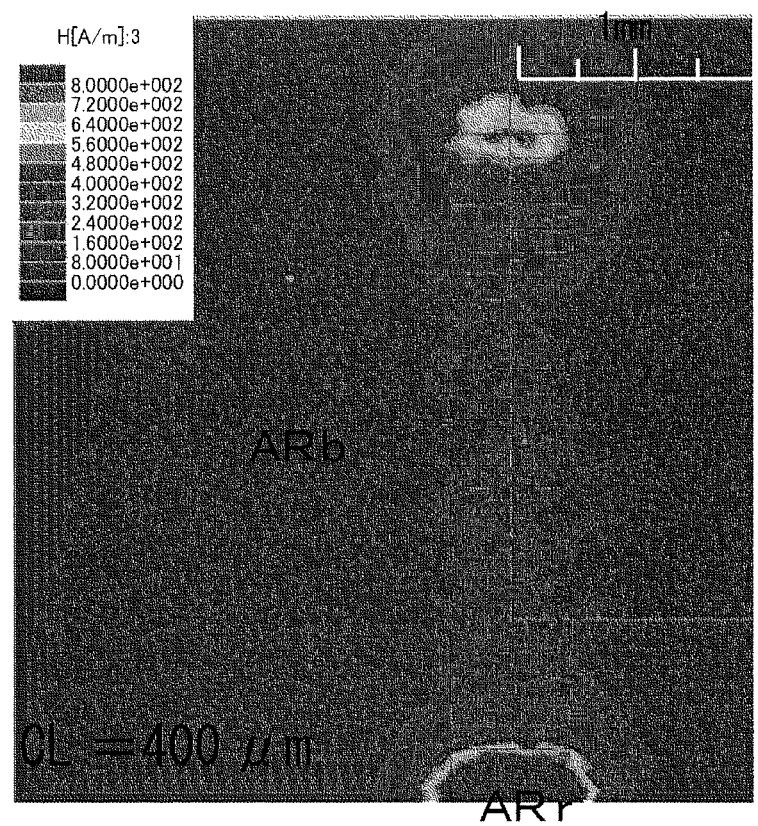

Moreover, FIG. 15 shows a magnetic field of the above-mentioned region with the same continuously recorded information at each of the spacings (CL=100 μm, 200 μm, 300 μm and 400 μm) obtained by magnetic field analyses in the case when the polarized ratio (effective section:invalid section) is set to 5:5. Moreover, FIG. 16 shows a magnetic field intensity distribution over the recording track units and the peripheral portion thereof at each of the spacings (CL=100 μm, 200 μm, 300 μm and 400 μm) obtained by magnetic field analyses in the case when the polarized ratio (effective section:invalid section) is set to 5:5.

In FIG. 16 (a color drawing is presented as a reference drawing), a blue-colored area ARb represents an area having an intensity of magnetic field of 0 Oe, while a red-colored area ARr represents an area having an intensity of 10 Oe or more. Moreover, in FIG. 16, FIG. 16(A) shows a case with the spacing (CL) of 100 μm, FIG. 16(B) shows a case with the spacing (CL) of 200 μm, FIG. 16(C) shows a case with the spacing (CL) of 300 μm and FIG. 16(D) shows a case with the spacing (CL) of 400 μm.

Figure 17:
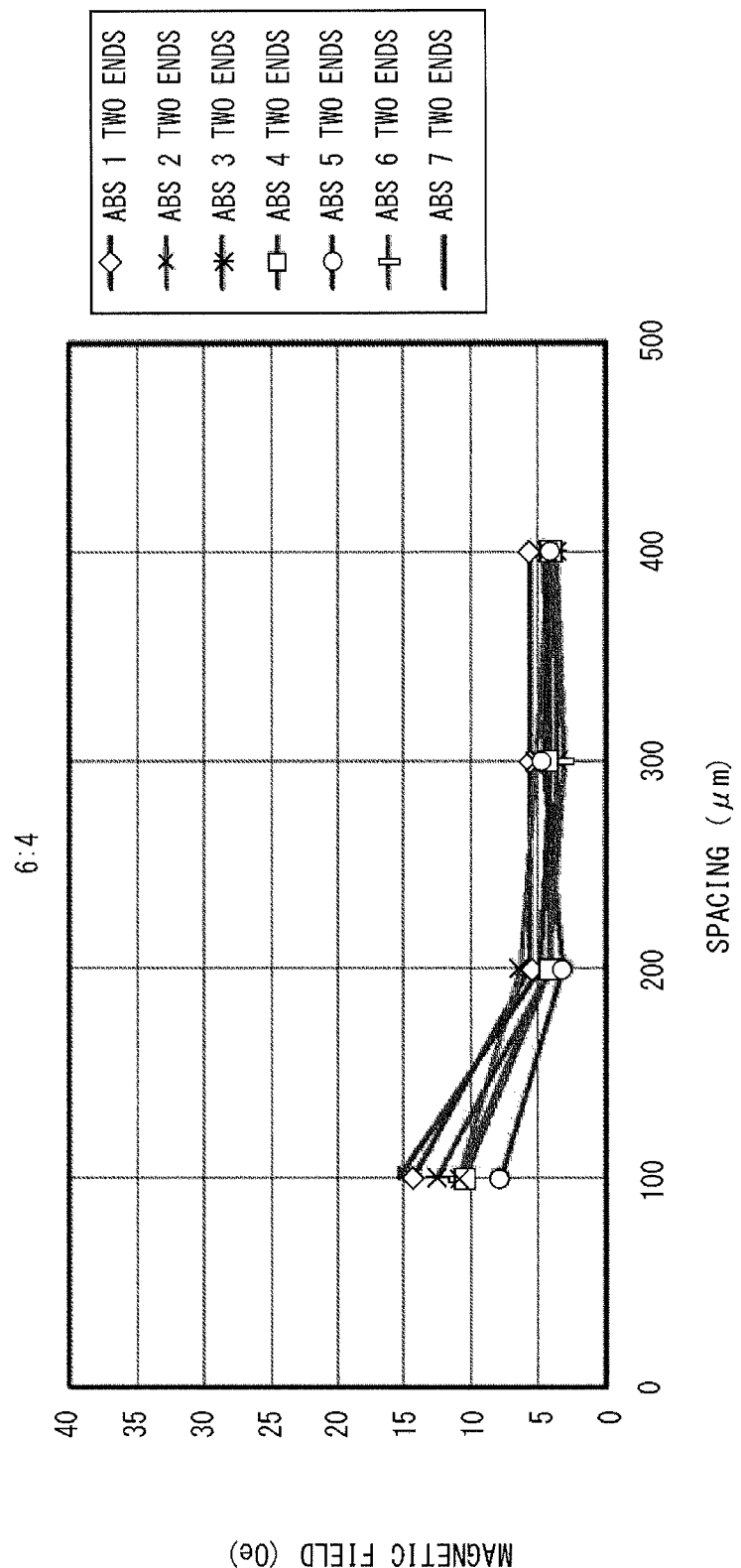
FIG. 17 is a drawing that shows a magnetic field between two ends of each of the seven detection regions (A to G), with the polarized ratio (effective section:invalid section) in the scale unit being set to 6:4 and with the spacings (CL) being set to 100 µm, 200 µm, 300 µm and 400 µm, in the above-mentioned position detecting device.

In contrast, in the above-mentioned position detecting device 100, in the case of setting the polarized ratio (effective section:invalid section) of the region with the same continuously recorded information in the scale unit 10 to 6:4, when the minimum magnetic field detected by the absolute pattern detection head 21 at the two end positions of the two ends of each of the seven detection regions (A to G) is plotted for each of spacings (CL=100 μm, 200 μm, 300 μm and 400 μm), all the values become positive values, each forming a virtually constant value at the respective spacings (CL=200 μm, 300 μm and 400 μm), as shown in FIG. 17.

Figure 18:
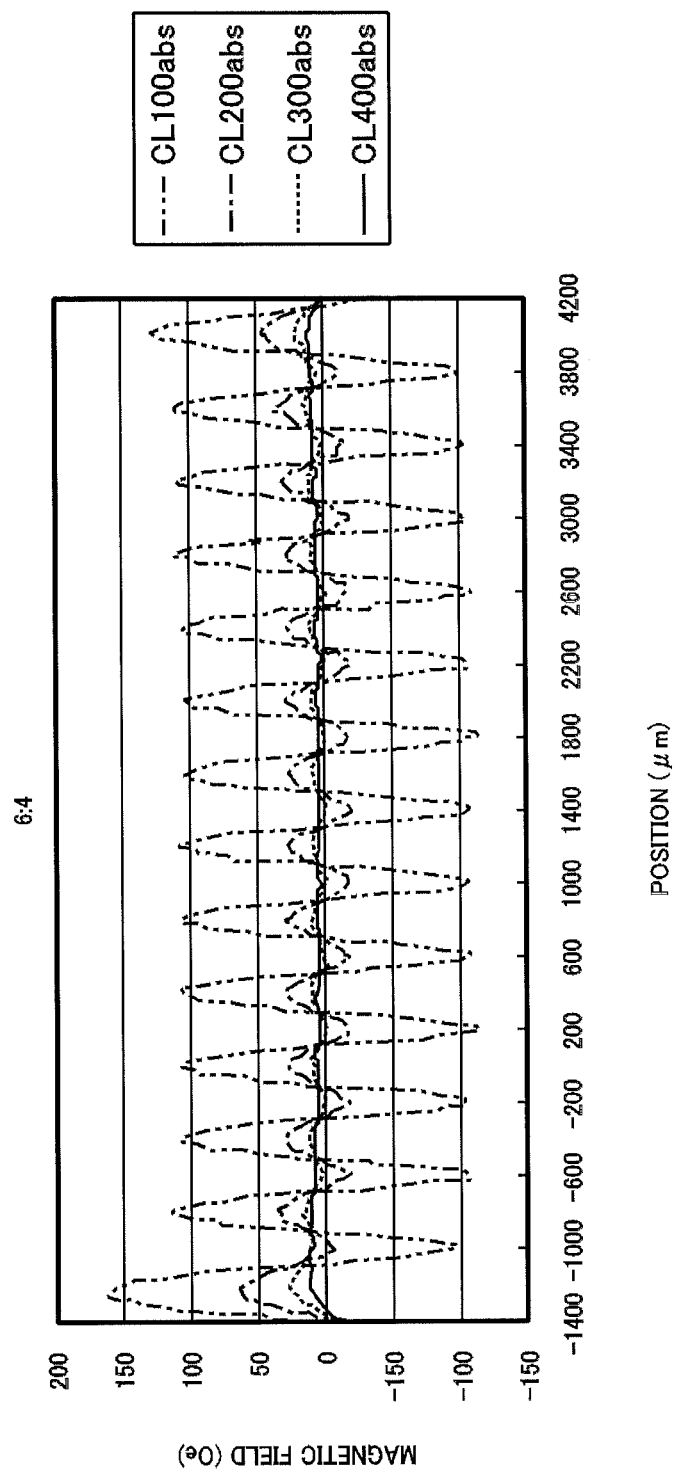
FIG. 18 is a drawing that shows an output magnetic field from a continuous recording unit obtained by magnetic field analyses, with the polarized ratio (effective section:invalid section) in the scale unit being set to 6:4, at the respective spacings (CL=100 µm, 200 µm, 300 µm and 400 µm) in the above-mentioned position detecting device.
Figure 19A:
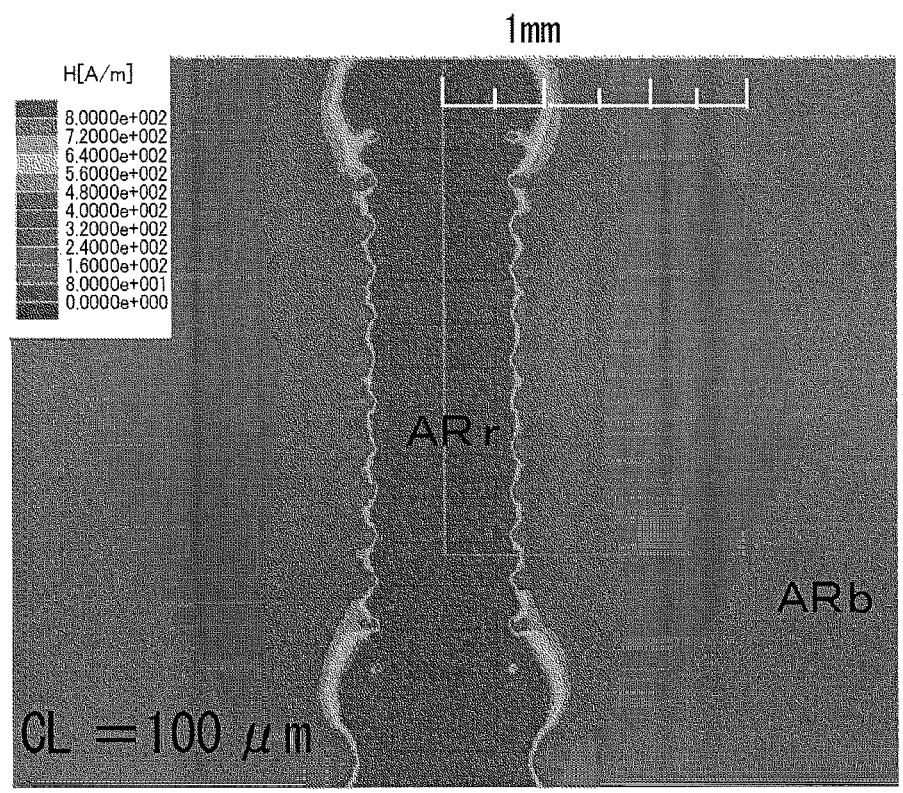
FIGS. 19(A), 19(B), 19(C) and 19(D) are drawings, each showing a magnetic field intensity distribution over a recording track and a peripheral portion thereof at each of spacings (CL) obtained by magnetic field analyses, with the polarized ratio (effective section:invalid section) in the scale unit being set to 6:4.
Figure 19B:
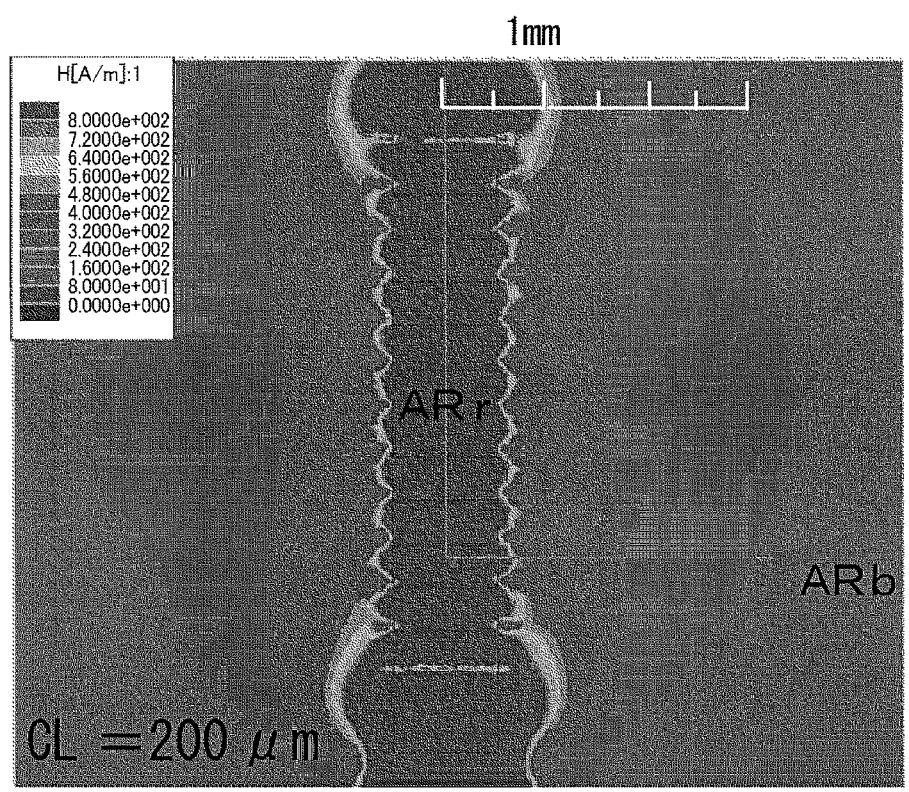
Figure 19C:
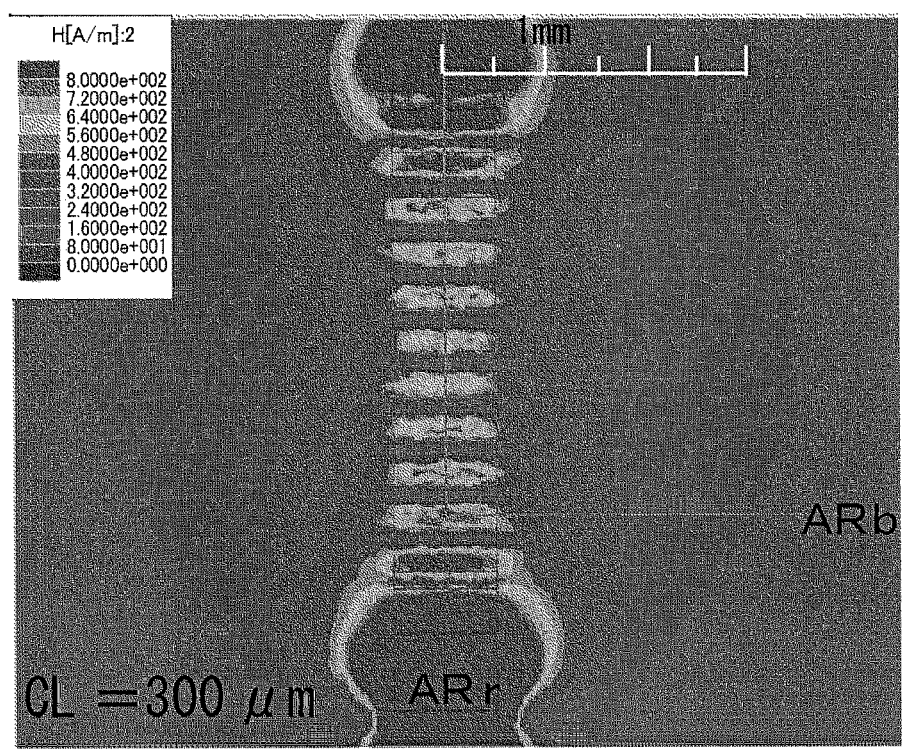
Figure 19D:
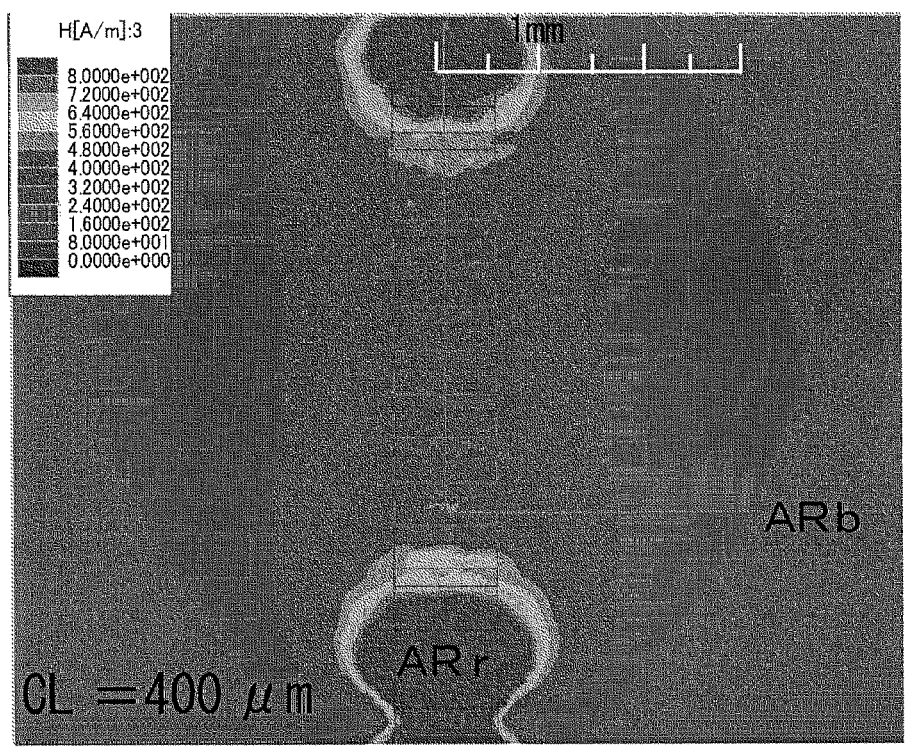

Moreover, FIG. 18 shows a magnetic field of the above-mentioned region with the same continuously recorded information at each of the spacings (CL=100 μm, 200 μm, 300 μm and 400 μm) obtained by magnetic field analyses in the case when the polarized ratio (effective section:invalid section) is set to 6:4. Furthermore, FIG. 19 shows a magnetic field intensity distribution over the recording track units and the peripheral portion thereof at each of the spacings (CL=100 μm, 200 μm, 300 μm and 400 μm) obtained by magnetic field analyses in the case when the polarized ratio (effective section:invalid section) is set to 6:4.

In FIG. 19 (a color drawing is presented as a reference drawing), a blue-colored area ARb represents an area having an intensity of magnetic field of 0 Oe, while a red-colored area ARr represents an area having an intensity of 10 Oe or more. Moreover, in FIG. 19, FIG. 19(A) shows a case with the spacing (CL) of 100 μm, FIG. 19(B) shows a case with the spacing (CL) of 200 μm, FIG. 19(C) shows a case with the spacing (CL) of 300 μm and FIG. 19(D) shows a case with the spacing (CL) of 400 μm.

Figure 20:
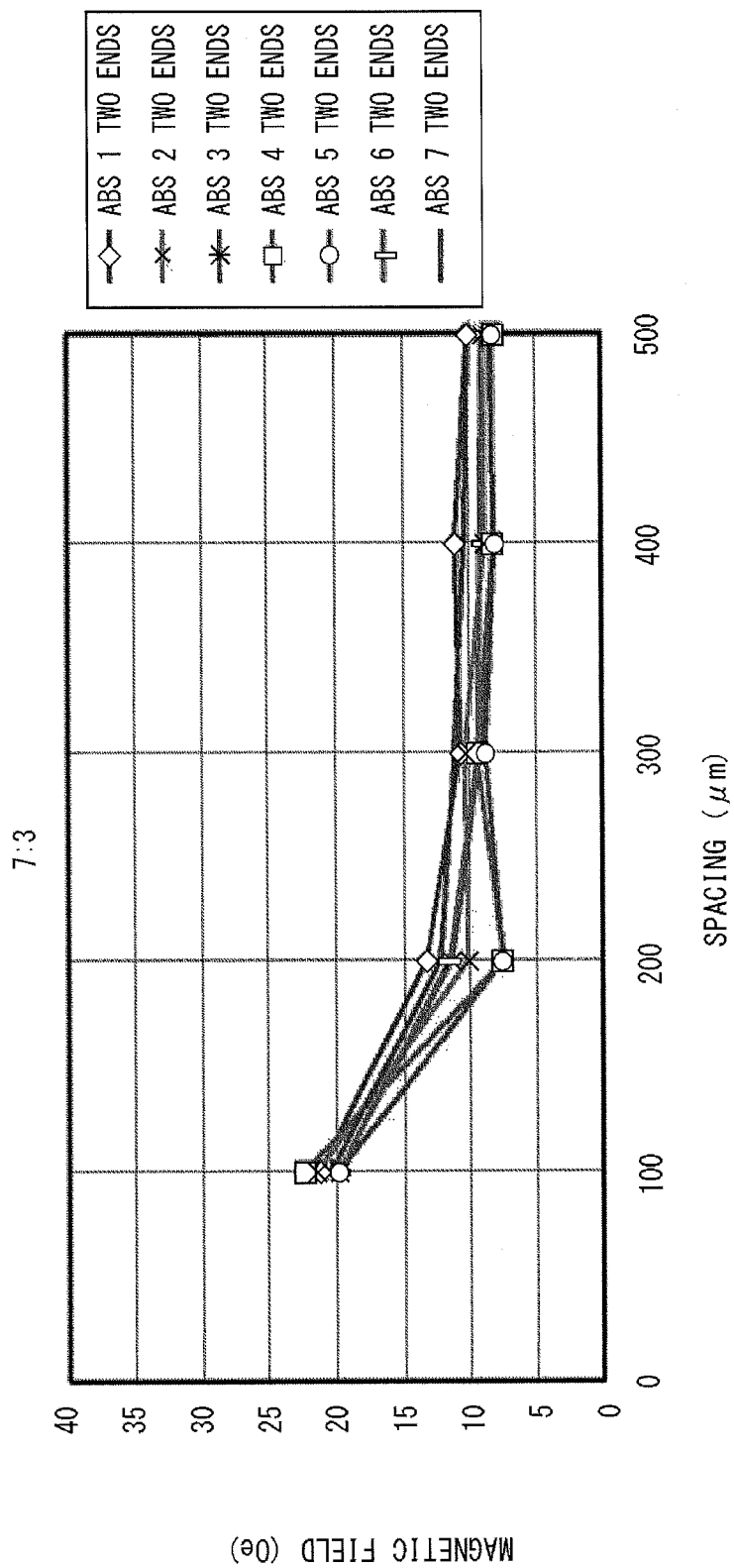
FIG. 20 is a drawing that shows a magnetic field between two ends of each of the seven detection regions (A to G), with the polarized ratio (effective section:invalid section) in the scale unit being set to 7:3 and with the spacings (CL) being set to 100 µm, 200 µm, 300 µm and 400 µm, in the above-mentioned position detecting device.

In contrast, in the above-mentioned position detecting device 100, in the case of setting the polarized ratio (effective section:invalid section) of the region with the same continuously recorded information in the scale unit 10 to 7:3, when the minimum magnetic field detected by the absolute pattern detection head 21 at the two end positions of the two ends of each of the seven detection regions (A to G) is plotted for each of spacings (CL=100 μm, 200 μm, 300 μm and 400 μm), all the values become positive values, each forming a virtually constant value at the respective spacings (CL=200 μm, 300 μm and 400 μm), as shown in FIG. 20.

Figure 21:
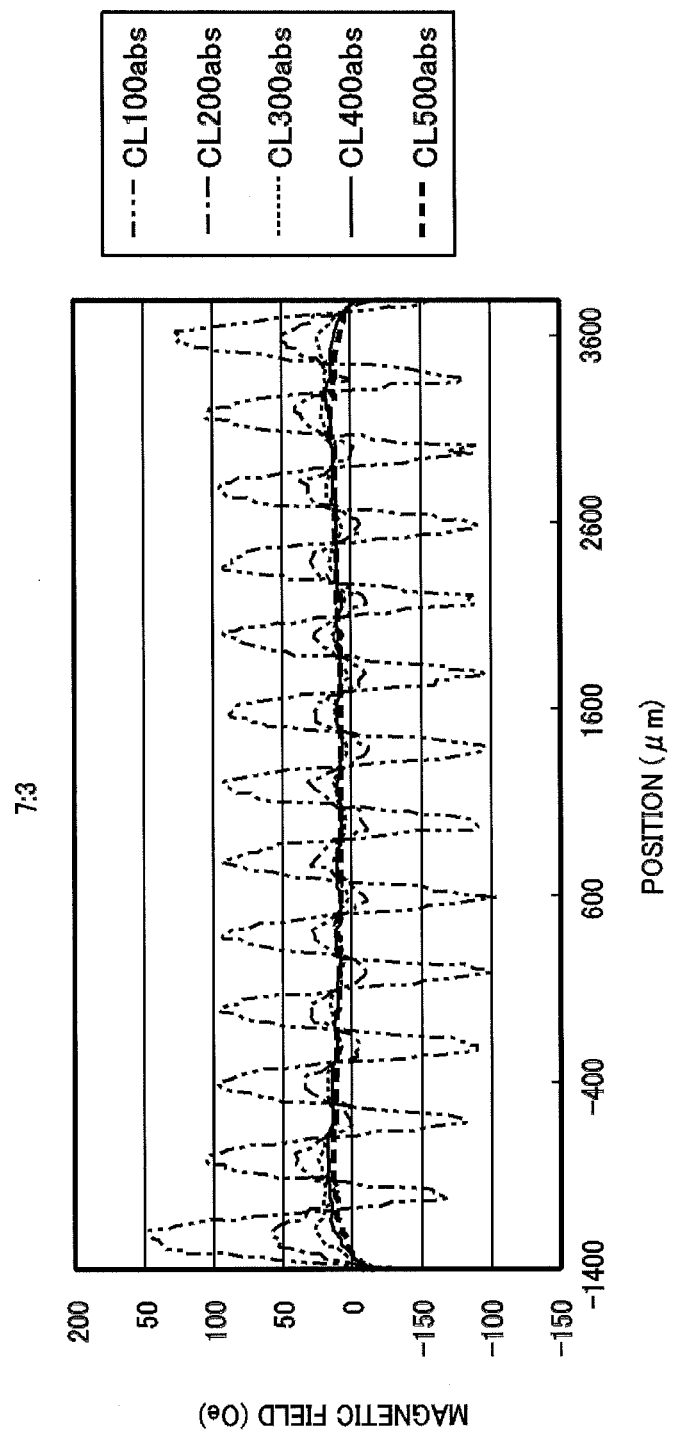
FIG. 21 is a drawing that shows an output magnetic field from a continuous recording unit obtained by magnetic field analyses, with the polarized ratio (effective section:invalid section) in the scale unit being set to 7:3, at the respective spacings (CL=100 µm, 200 µm, 300 µm and 400 µm) in the above-mentioned position detecting device.
Figure 22A:
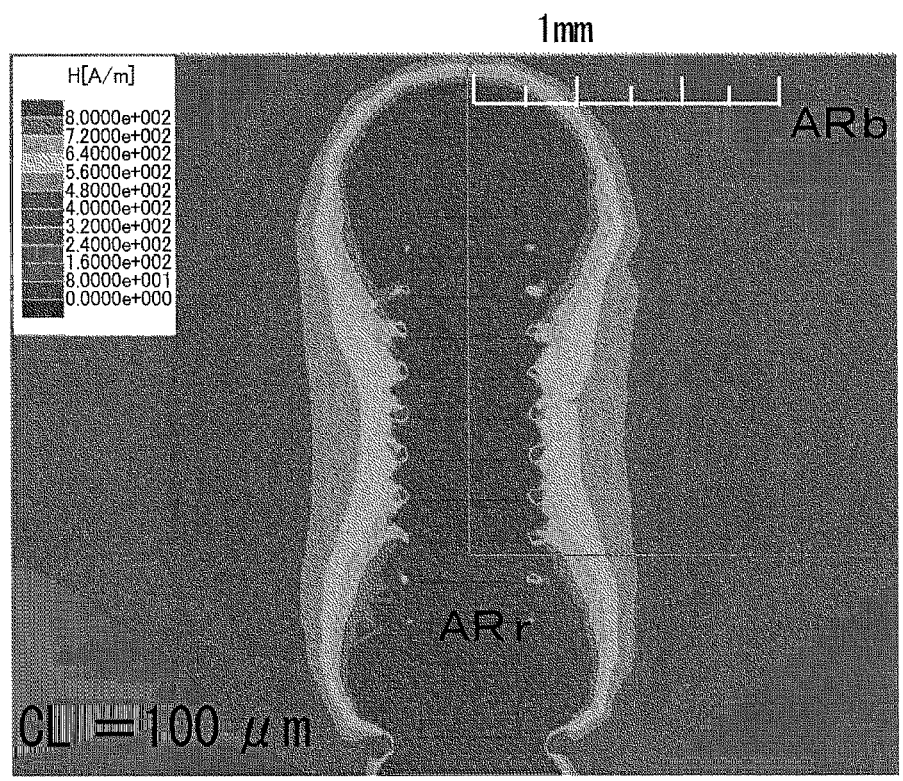
FIGS. 22(A), 22(B), 22(C) and 22(D) are drawings, each showing a magnetic field intensity distribution over a recording track and a peripheral portion thereof at each of spacings (CL) obtained by magnetic field analyses, with the polarized ratio (effective section:invalid section) in the scale unit being set to 7:3.
Figure 22B:
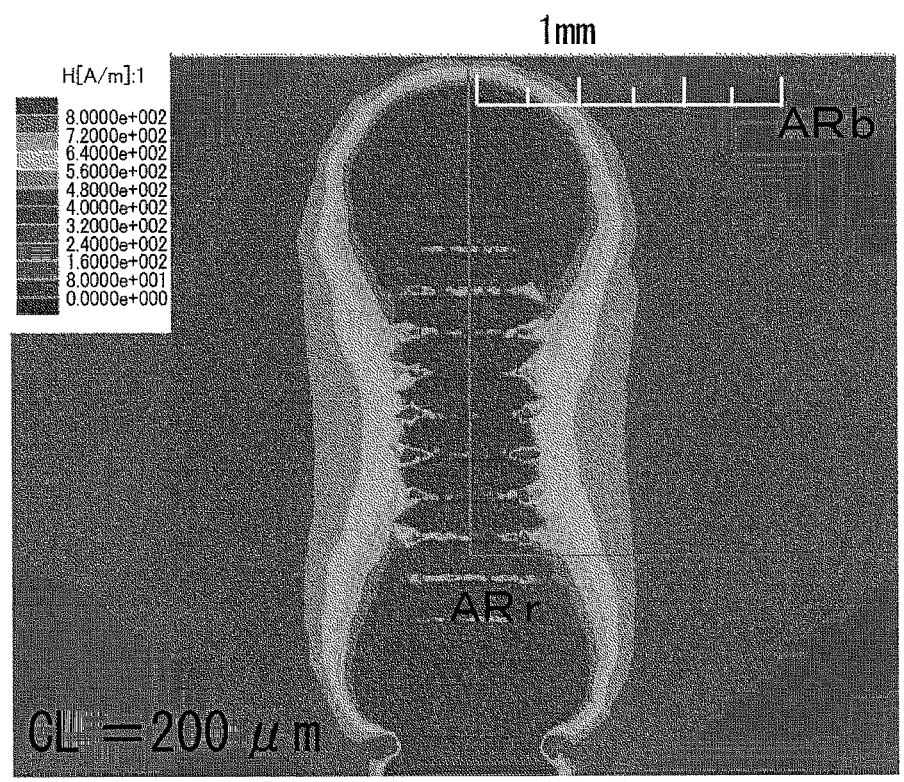
Figure 22C:
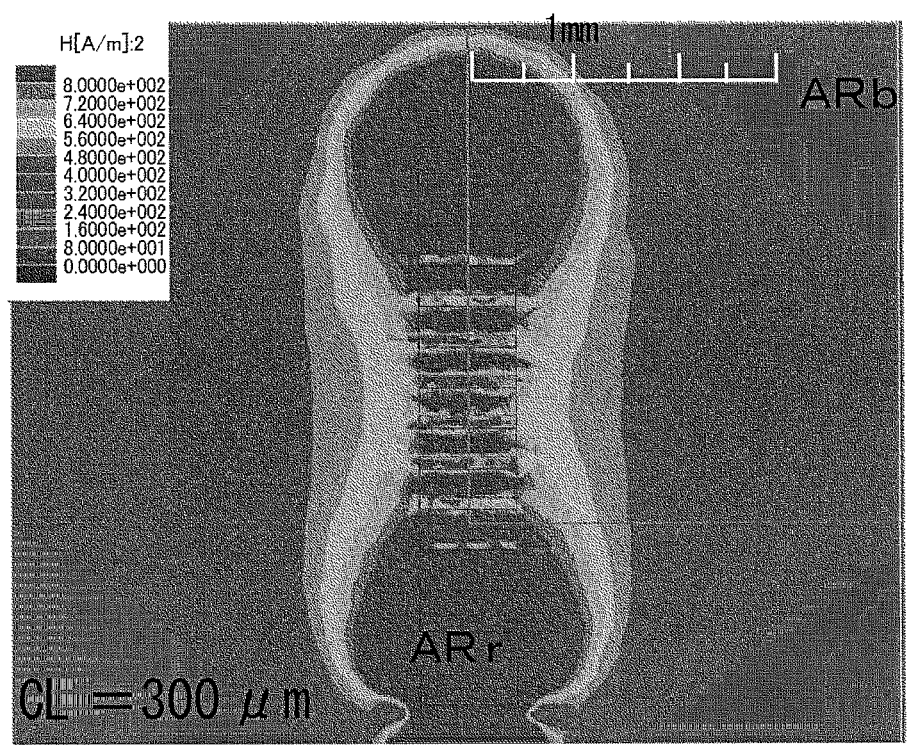
Figure 22D:
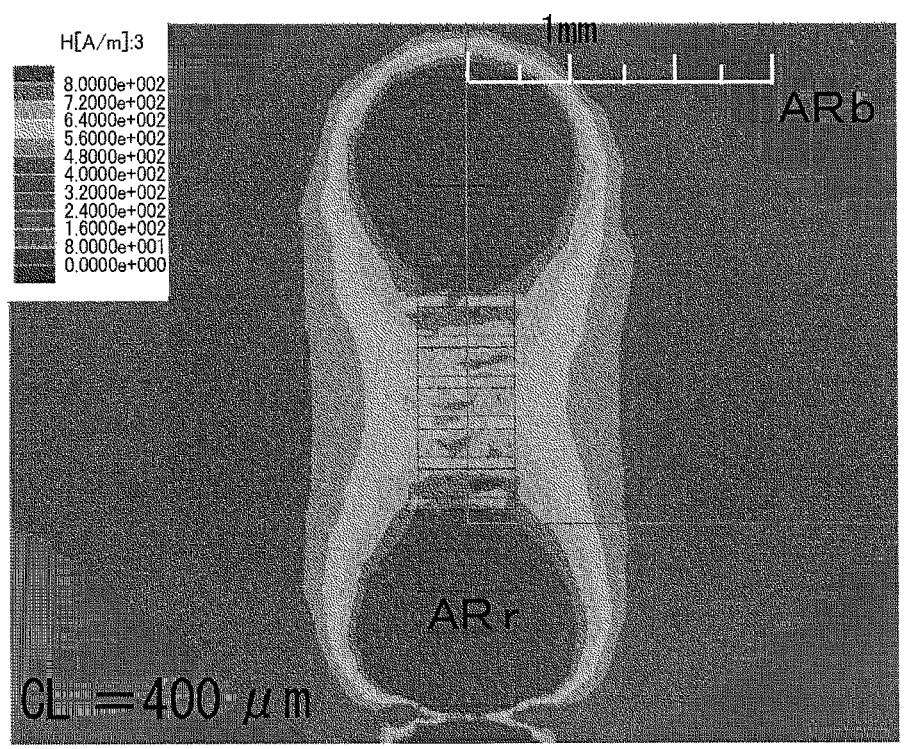

Moreover, FIG. 21 shows a magnetic field of the above-mentioned region with the same continuously recorded information at each of the spacings (CL=100 μm, 200 μm, 300 μm and 400 μm) obtained by magnetic field analyses in the case when the polarized ratio (effective section:invalid section) is set to 7:3. Furthermore, FIG. 22 show a magnetic field intensity distribution over the recording track units and the peripheral portion thereof at each of the spacings (CL=100 μm, 200 μm, 300 μm and 400 μm) obtained by magnetic field analyses in the case when the polarized ratio (effective section:invalid section) is set to 7:3.

In FIG. 22 (a color drawing is presented as a reference drawing), a blue-colored area ARb represents an area having an intensity of magnetic field of 0 Oe, while a red-colored area ARr represents an area having an intensity of 10 Oe or more. Moreover, in FIG. 22, FIG. 22(A) shows a case with the spacing (CL) of 100 μm, FIG. 22(B) shows a case with the spacing (CL) of 200 μm, FIG. 22(C) shows a case with the spacing (CL) of 300 μm and FIG. 22(D) shows a case with the spacing (CL) of 400 μm.

Figure 23:
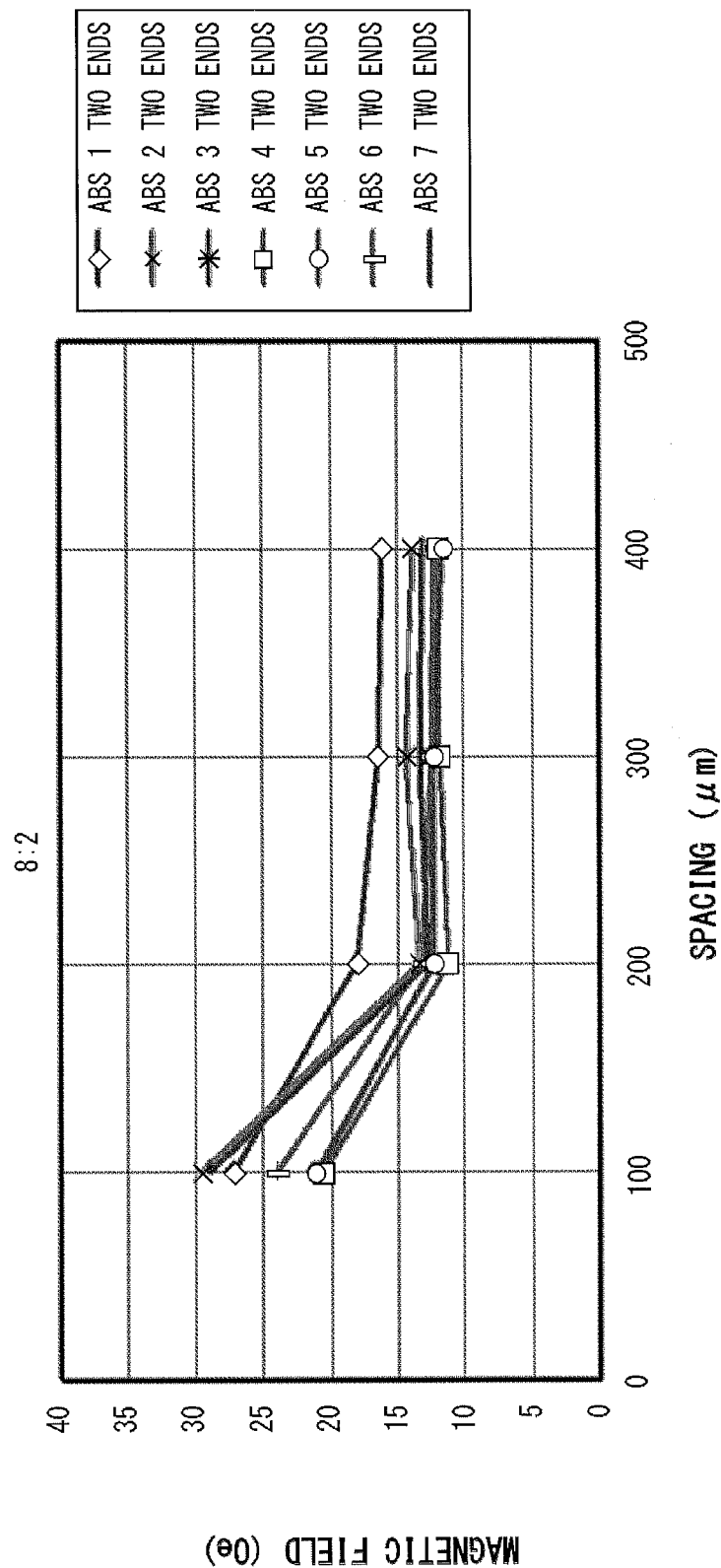
FIG. 23 is a drawing that shows a magnetic field between two ends of each of the seven detection regions (A to G), with the polarized ratio (effective section:invalid section) in the scale unit being set to 8:2 and with the spacings (CL) being set to 100 µm, 200 µm, 300 µm and 400 µm, in the above-mentioned position detecting device.

Moreover, in the above-mentioned position detecting device 100, in the case of setting the polarized ratio (effective section:invalid section) of the region with the same continuously recorded information in the scale unit 10 to 8:2, when the minimum magnetic field detected by the absolute pattern detection head 21 at the two end positions of the two ends of each of the seven detection regions (A to G) is plotted for each of spacings (CL=100 µm, 200 µm, 300 µm and 400 µm), all the values become positive values, each forming a virtually constant value at the respective spacings (CL=200 µm, 300 µm and 400 µm), as shown in FIG. 23.

Figure 24:
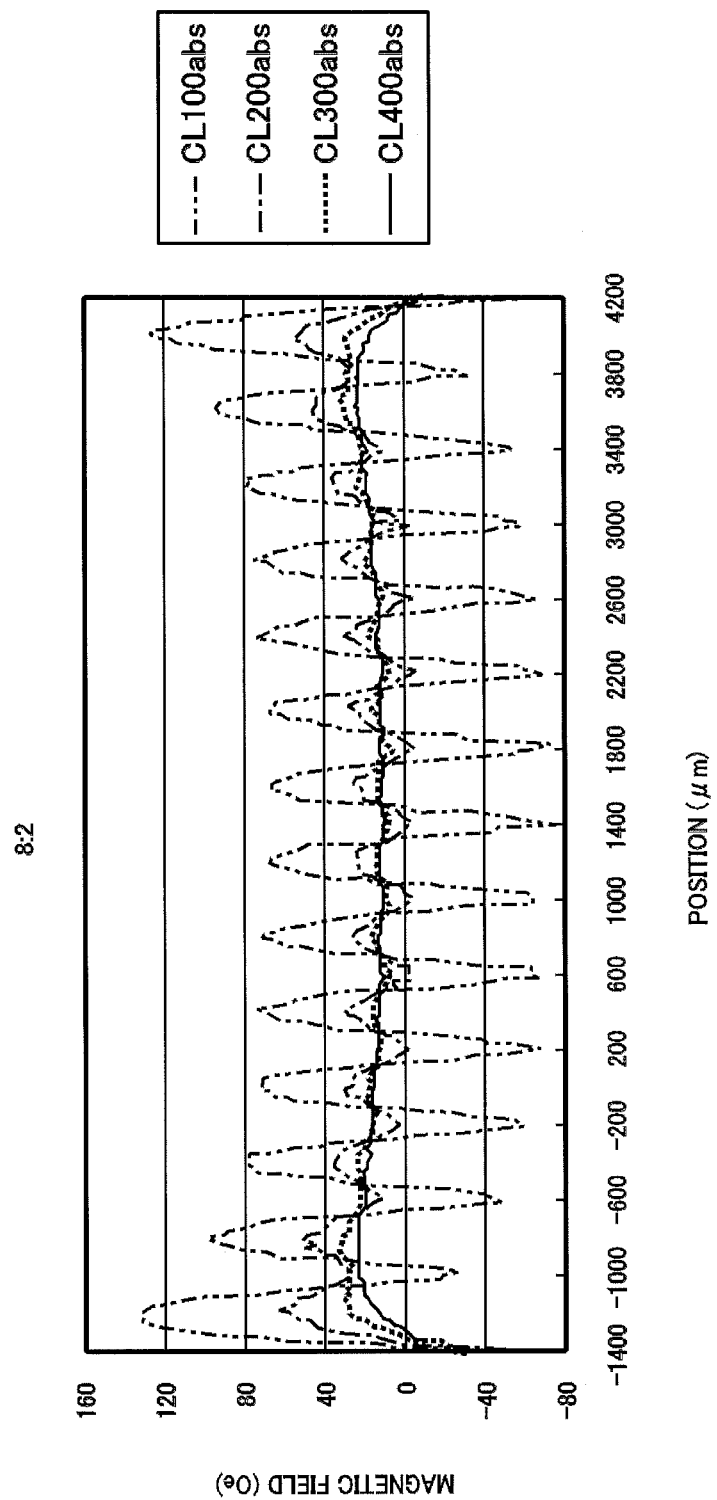
FIG. 24 is a drawing that shows an output magnetic field from a continuous recording unit obtained by magnetic field analyses, with the polarized ratio (effective section:invalid section) in the scale unit being set to 8:2, at the respective spacings (CL=100 µm, 200 µm, 300 µm and 400 µm) in the above-mentioned position detecting device.
Figure 25A:
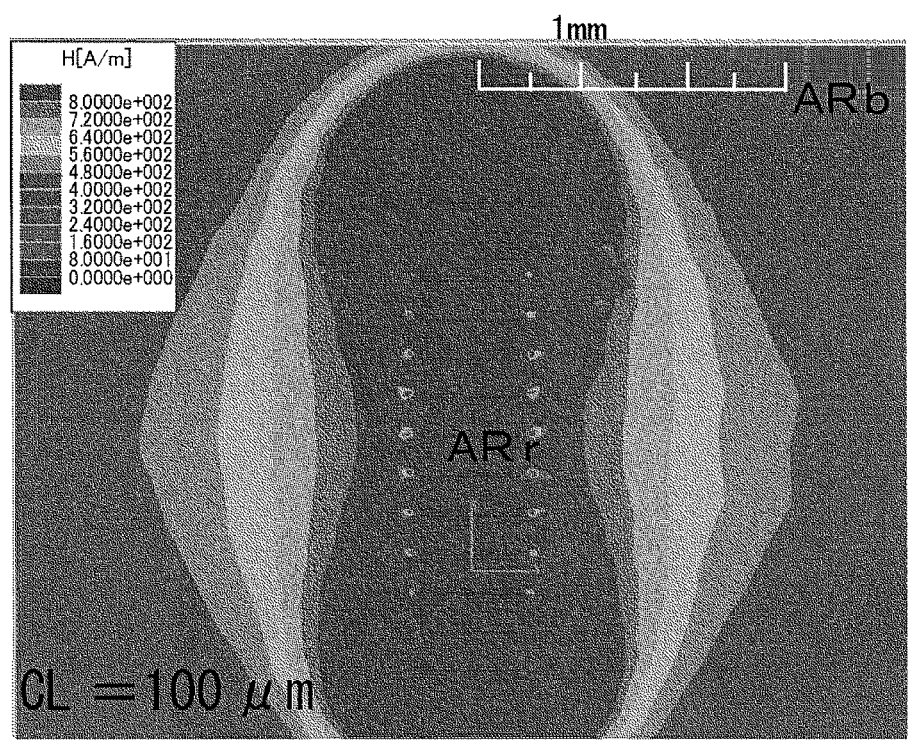
FIGS. 25(A), 25(B), 25(C) and 25(D) are drawings, each showing a magnetic field intensity distribution over a recording track and a peripheral portion thereof at each of spacings (CL) obtained by magnetic field analyses, with the polarized ratio (effective section:invalid section) in the scale unit being set to 8:2.
Figure 25B:
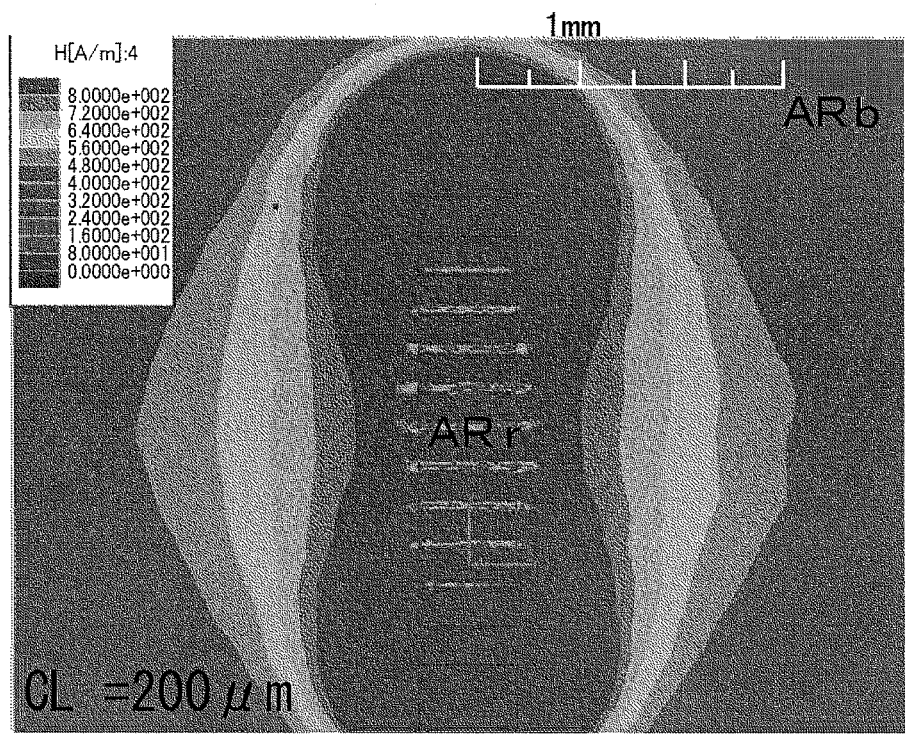
Figure 25C:
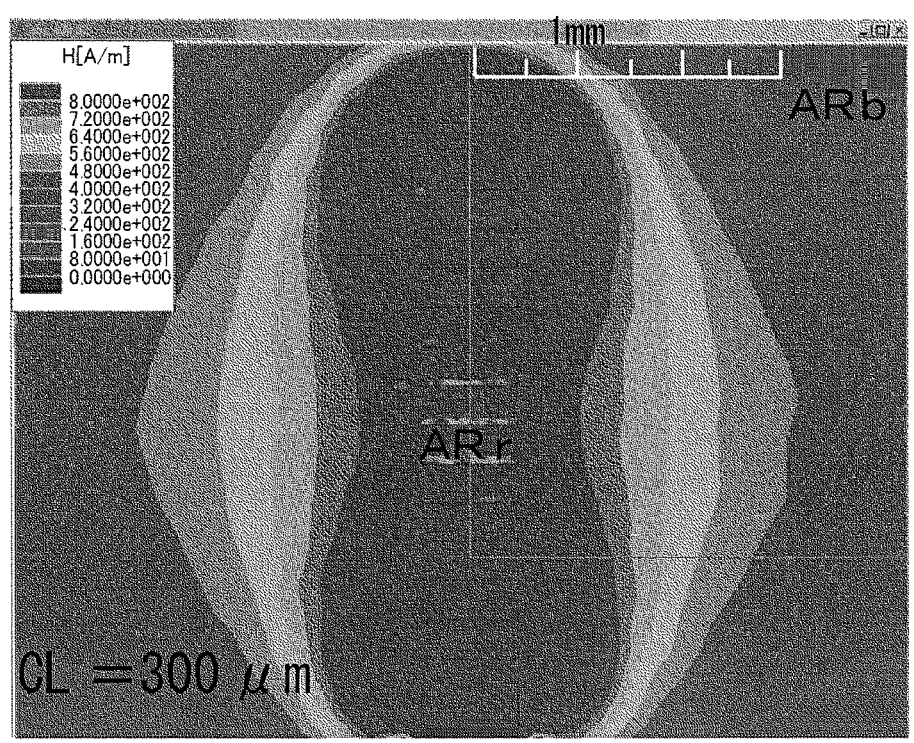
Figure 25D:
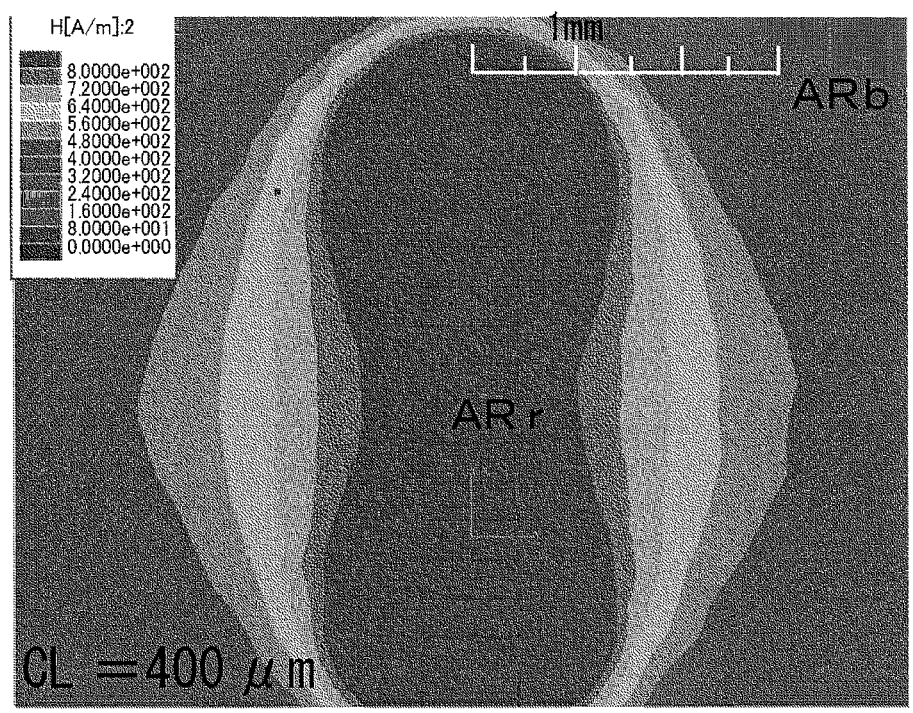

Moreover, FIG. 24 shows a magnetic field of the above-mentioned region with the same continuously recorded information at each of the spacings (CL=100 µm, 200 µm, 300 µm and 400 µm) obtained by magnetic field analyses in the case when the polarized ratio (effective section:invalid section) is set to 8:2. Furthermore, FIG. 25 show a magnetic field intensity distribution over the recording track units and the peripheral portion thereof at each of the spacings (CL=100 µm, 200 µm, 300 µm and 400 µm) obtained by magnetic field analyses in the case when the polarized ratio (effective section:invalid section) is set to 8:2.

In FIG. 25 (a color drawing is presented as a reference drawing), a blue-colored area ARb represents an area having an intensity of magnetic field of 0 Oe, while a red-colored area ARr represents an area having an intensity of 10 Oe or more. Moreover, in FIG. 25, FIG. 25(A) shows a case with the spacing (CL) of 100 µm, FIG. 25(B) shows a case with the spacing (CL) of 200 µm, FIG. 25(C) shows a case with the spacing (CL) of 300 µm and FIG. 25(D) shows a case with the spacing (CL) of 400 µm.

Figure 26:
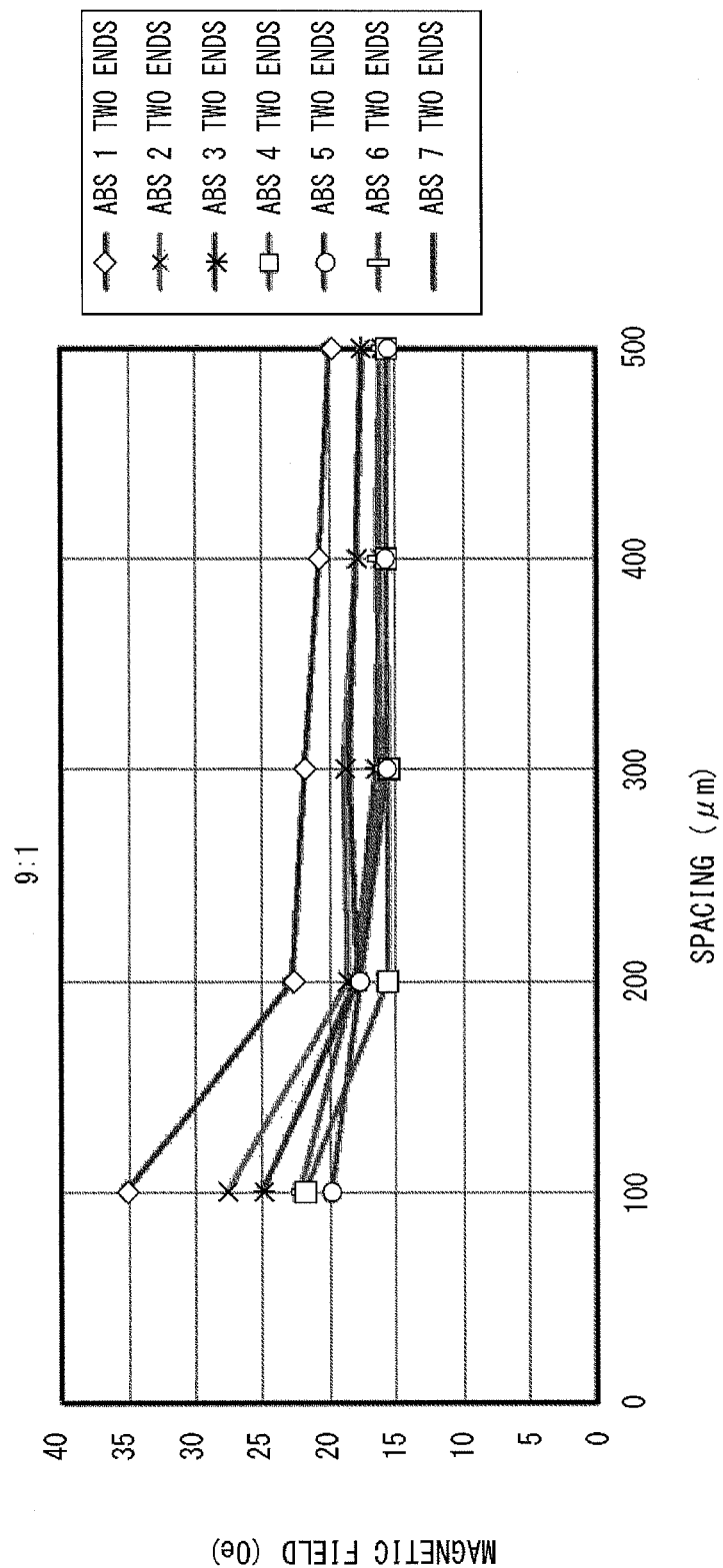
FIG. 26 is a drawing that shows a magnetic field between two ends of each of the seven detection regions (A to G), with the polarized ratio (effective section:invalid section) in the scale unit being set to 9:1 and with the spacings (CL) being set to 100 µm, 200 µm, 300 µm and 400 µm, in the above-mentioned position detecting device.

Moreover, in the above-mentioned position detecting device 100, in the case of setting the polarized ratio (effective section:invalid section) of the region with the same continuously recorded information in the scale unit 10 to 9:1, when the minimum magnetic field detected by the absolute pattern detection head 21 at the two end positions of the two ends of each of the seven detection regions (A to G) is plotted for each of spacings (CL=100 µm, 200 µm, 300 µm and 400 µm), all the values become positive values, each forming a virtually constant value at the respective spacings (CL=200 µm, 300 µm and 400 µm), as shown in FIG. 26.

Figure 27:
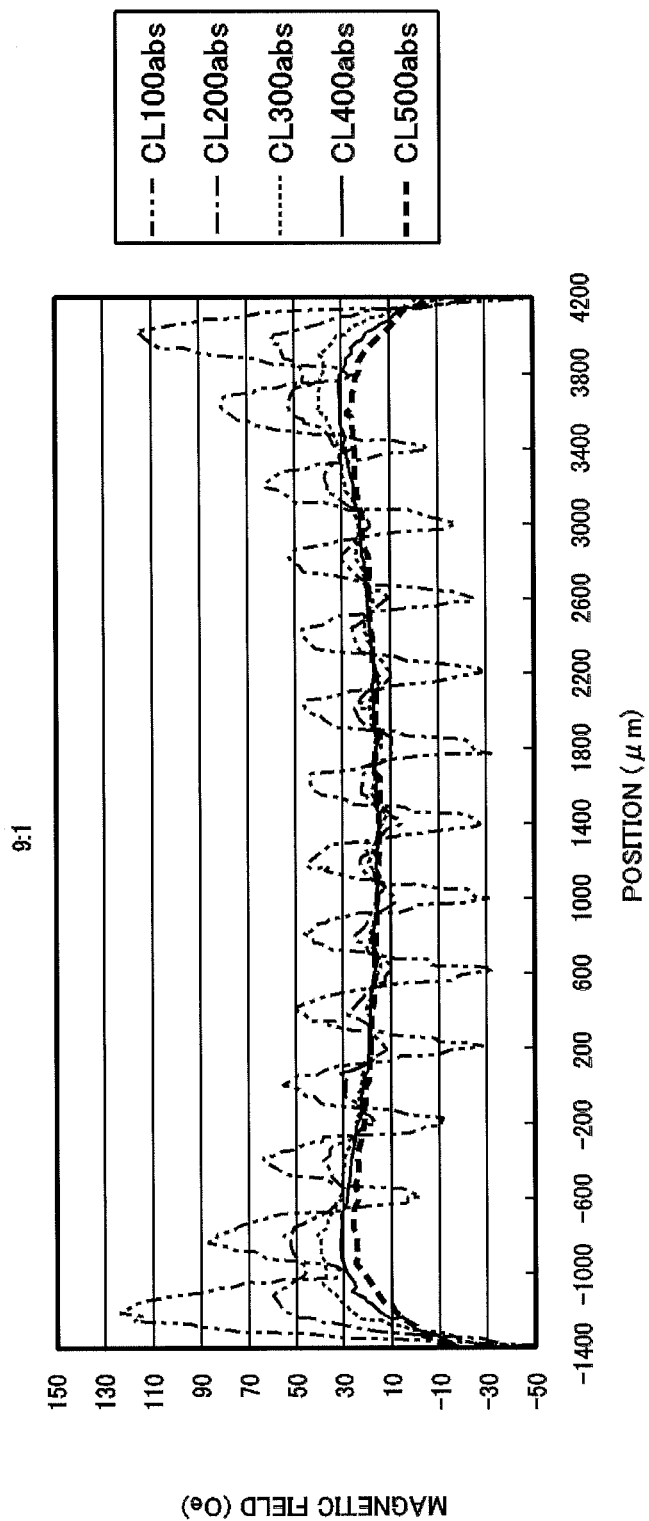
FIG. 27 is a drawing that shows an output magnetic field from a continuous recording unit obtained by magnetic field analyses, with the polarized ratio (effective section:invalid section) in the scale unit being set to 9:1, at the respective spacings (CL=100 µm, 200 µm, 300 µm and 400 µm) in the above-mentioned position detecting device.
Figure 28A:
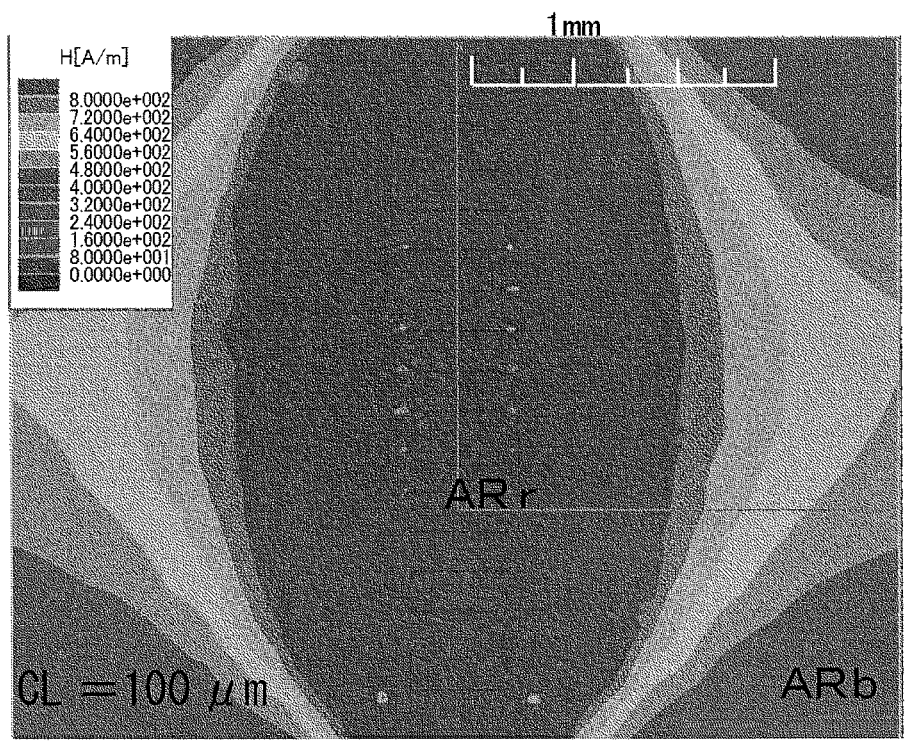
FIGS. 28(A), 28(B), 28(C) and 28(D) are drawings, each showing a magnetic field intensity distribution over a recording track and a peripheral portion thereof at each of spacings (CL) obtained by magnetic field analyses, with the polarized ratio (effective section:invalid section) in the scale unit being set to 9:1.
Figure 28B:
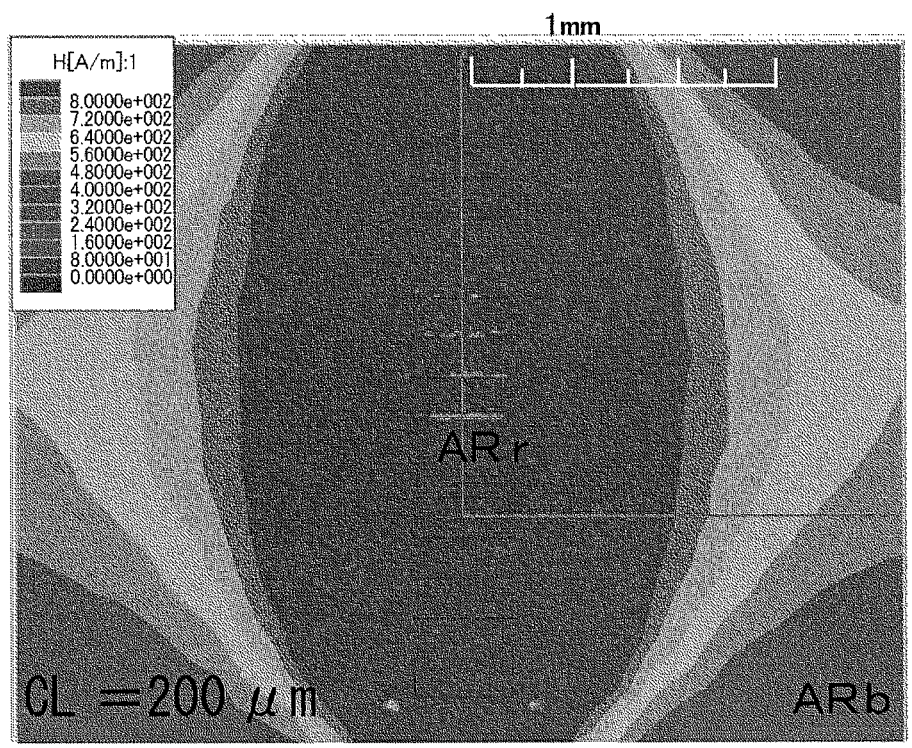
Figure 28C:
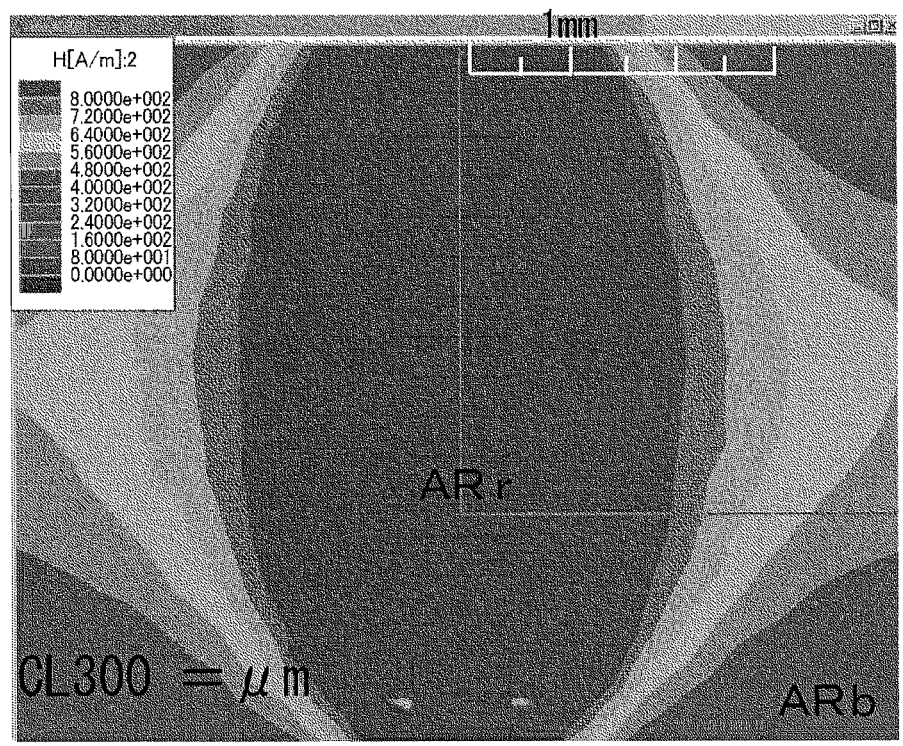
Figure 28D:
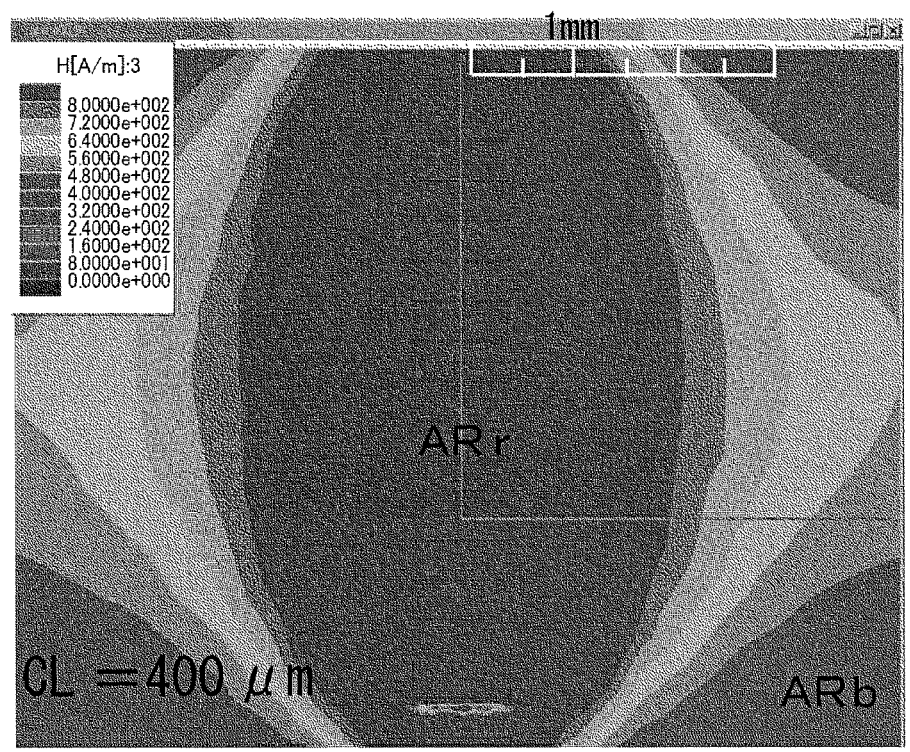

Moreover, FIG. 27 shows a magnetic field of the above-mentioned region with the same continuously recorded information at each of the spacings (CL=100 µm, 200 µm, 300 µm and 400 µm) obtained by magnetic field analyses in the case when the polarized ratio (effective section:invalid section) is set to 9:1. Furthermore, FIG. 28 show a magnetic field intensity distribution over the recording track units and the peripheral portion thereof at each of the spacings (CL=100 µm, 200 µm, 300 µm and 400 µm) obtained by magnetic field analyses in the case when the polarized ratio (effective section:invalid section) is set to 9:1.

In FIG. 28 (a color drawing is presented as a reference drawing), a blue-colored area ARb represents an area having an intensity of magnetic field of 0 Oe, while a red-colored area ARr represents an area having an intensity of 10 Oe or more. Moreover, in FIG. 28, FIG. 28(A) shows a case with the spacing (CL) of 100 µm, FIG. 28(B) shows a case with the spacing (CL) of 200 µm, FIG. 28(C) shows a case with the spacing (CL) of 300 µm and FIG. 28(D) shows a case with the spacing (CL) of 400 µm.

Figure 29:
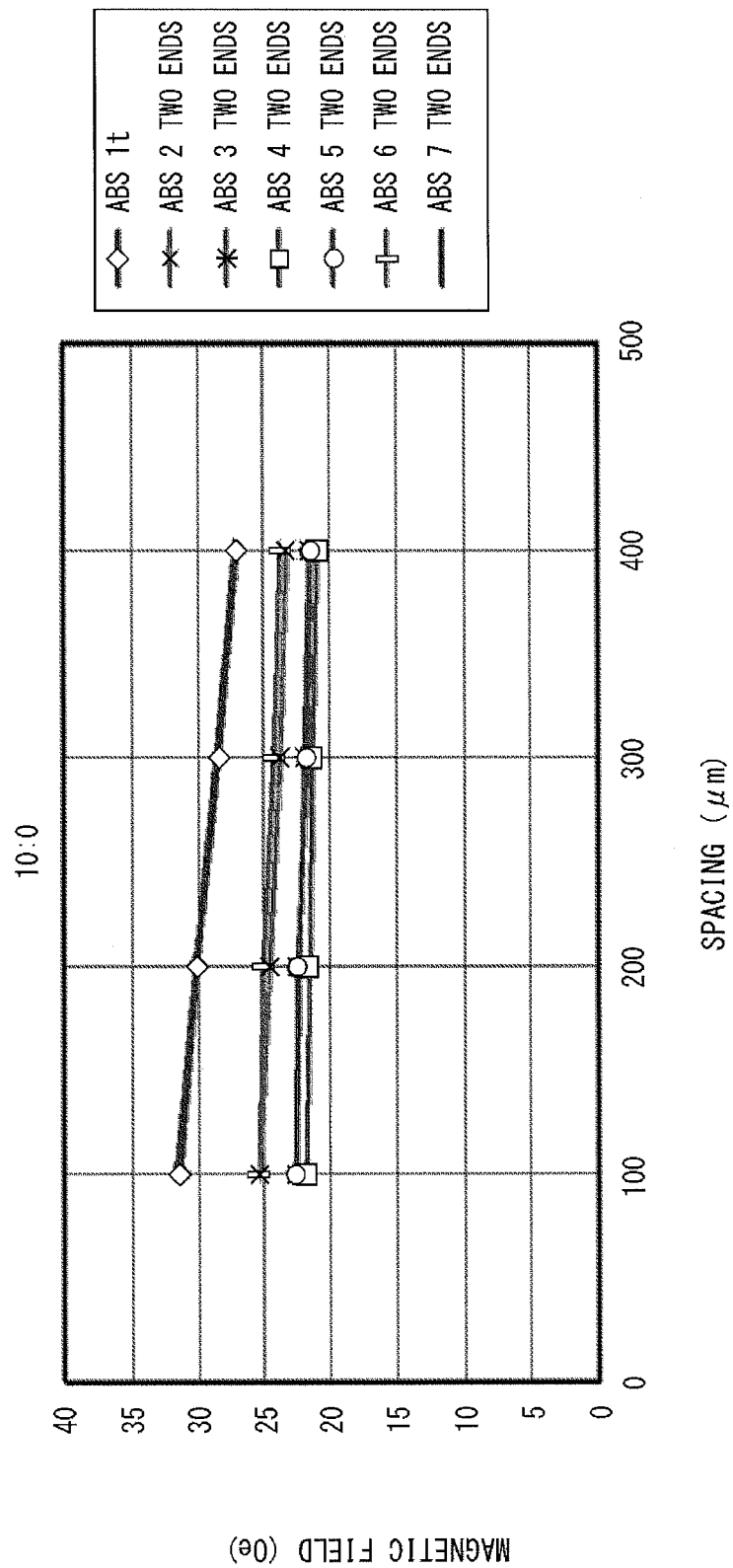
FIG. 29 is a drawing that shows a magnetic field between two ends of each of the seven detection regions (A to G), with the polarized ratio (effective section:invalid section) in the scale unit being set to 10:0 and with the spacings (CL) being set to 100 µm, 200 µm, 300 µm and 400 µm, in the above-mentioned position detecting device.

Moreover, in the above-mentioned position detecting device 100, in the case of setting the polarized ratio (effective section:invalid section) of the region with the same continuously recorded information in the scale unit 10 to 10:0, when the minimum magnetic field detected by the absolute pattern detection head 21 at the two end positions of the two ends of each of the seven detection regions (A to G) is plotted for each of spacings (CL=100 µm, 200 µm, 300 µm and 400 µm), the resulting graph as shown in FIG. 29 is obtained.

Figure 30:
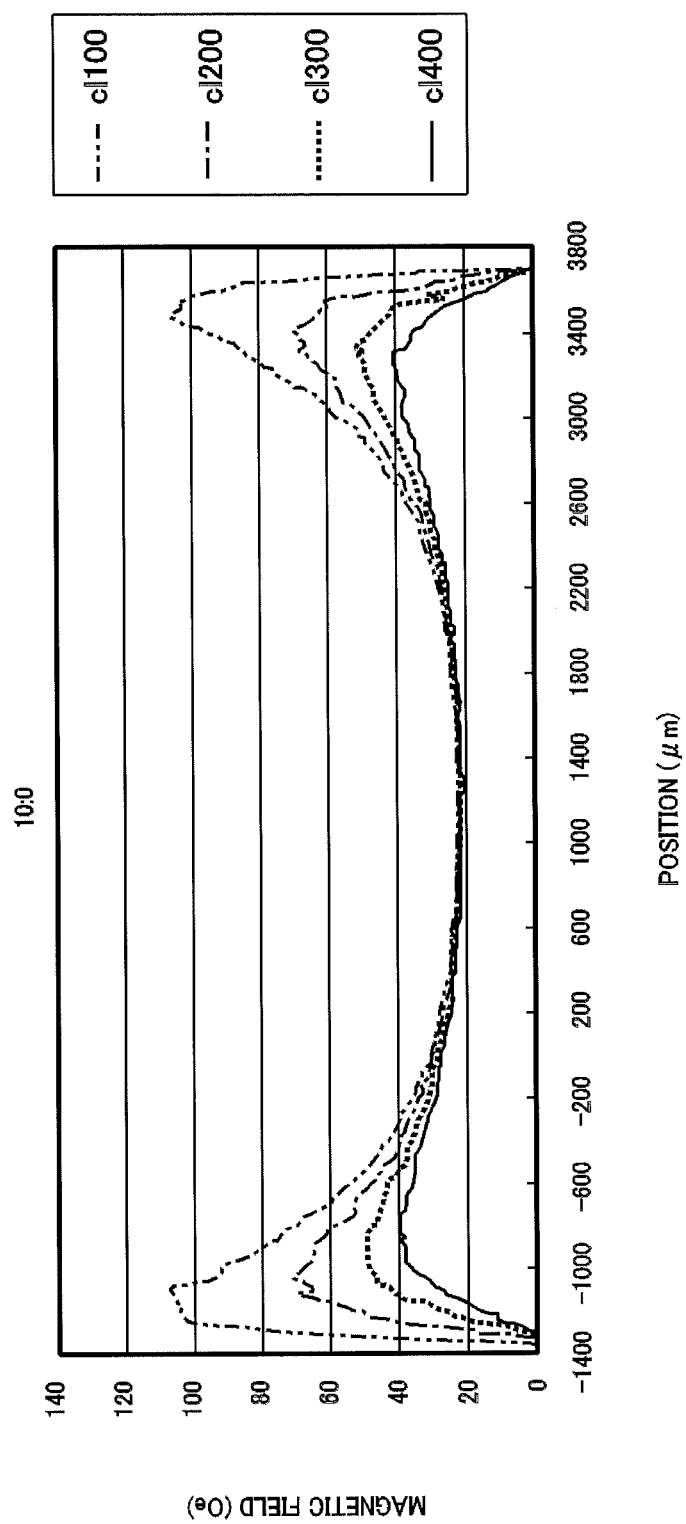
FIG. 30 is a drawing that shows an output magnetic field from a continuous recording unit obtained by magnetic field analyses, with the polarized ratio (effective section:invalid section) in the scale unit being set to 10:0, at the respective spacings (CL=100 µm, 200 µm, 300 µm and 400 µm) in the above-mentioned position detecting device.
Figure 31A:
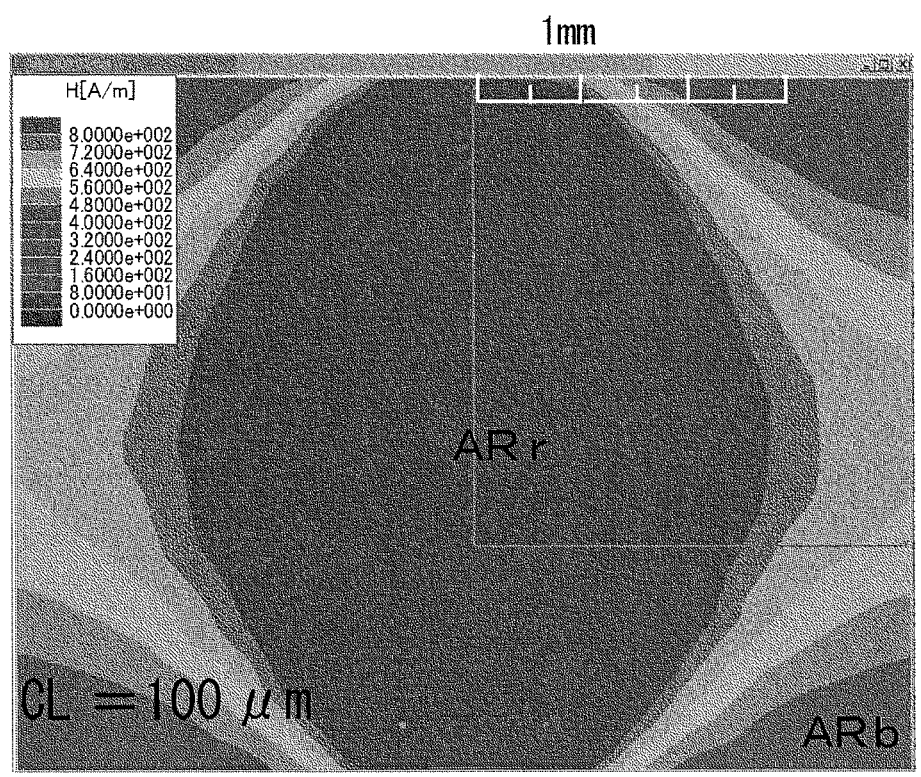
FIGS. 31(A), 31(B), 31(C) and 31(D) are drawings, each showing a magnetic field intensity distribution over a recording track and a peripheral portion thereof at each of spacings (CL) obtained by magnetic field analyses, with the polarized ratio (effective section:invalid section) in the scale unit being set to 10:0.
Figure 31B:
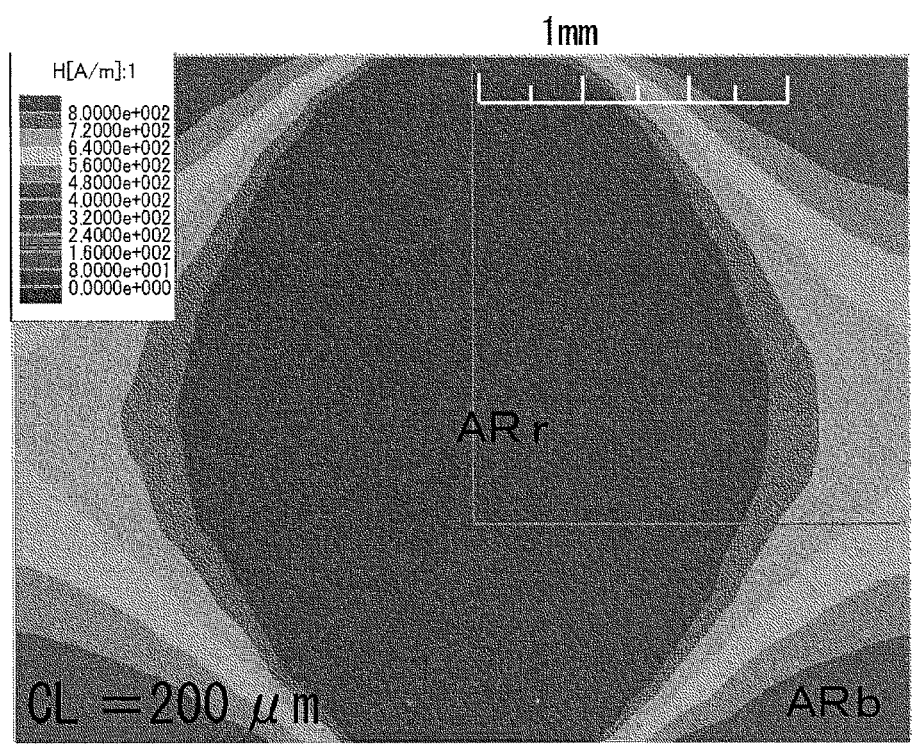
Figure 31C:
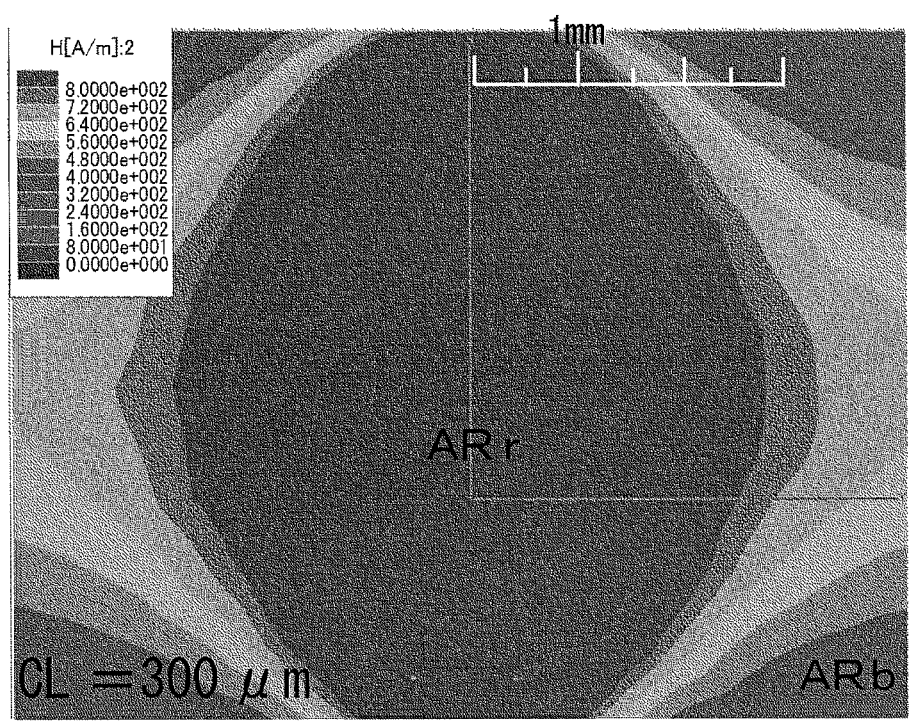
Figure 31D:
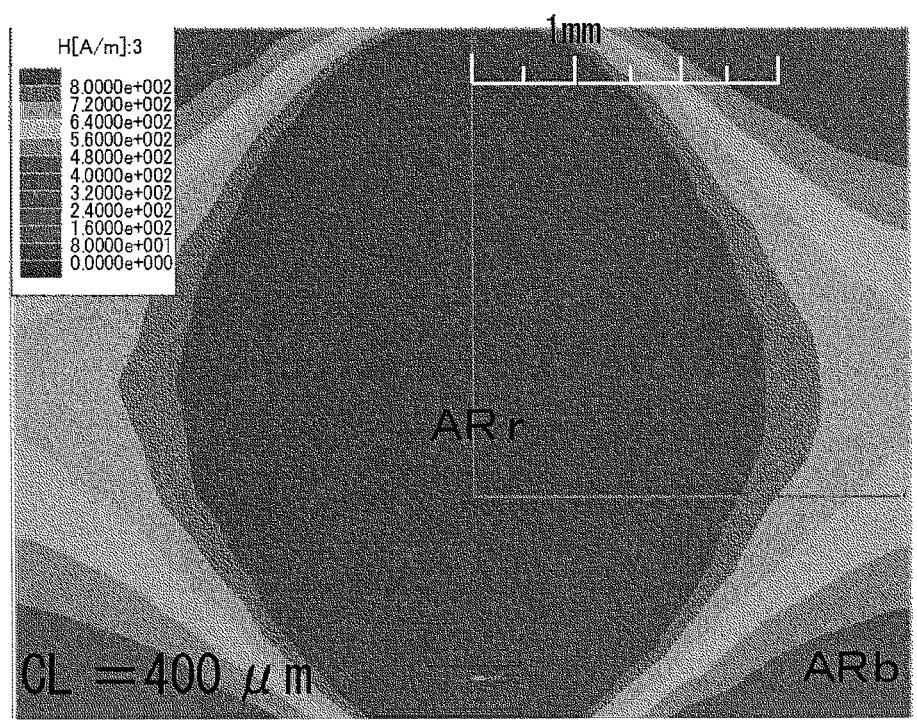

FIG. 30 shows a magnetic field of the above-mentioned region with the same continuously recorded information at each of the spacings (CL=100 µm, 200 µm, 300 µm and 400 µm) obtained by magnetic field analyses in the case when the polarized ratio (effective section:invalid section) is set to 10:0. Moreover, FIG. 31 show a magnetic field intensity distribution over the recording track units and the peripheral portion thereof at each of the spacings (CL=100 µm, 200 µm, 300 µm and 400 µm) obtained by magnetic field analyses in the case when the polarized ratio (effective section:invalid section) is set to 10:0. In FIG. 31 (a color drawing is presented as a reference drawing), a blue-colored area ARb represents an area having an intensity of magnetic field of 0 Oe, while a red-colored area ARr represents an area having an intensity of 10 Oe or more. Moreover, in FIG. 31, FIG. 31(A) shows a case with the spacing (CL) of 100 µm, FIG. 31(B) shows a case with the spacing (CL) of 200 µm, FIG. 31(C) shows a case with the spacing (CL) of 300 µm and FIG. 31(D) shows a case with the spacing (CL) of 400 µm.

Figure 32:
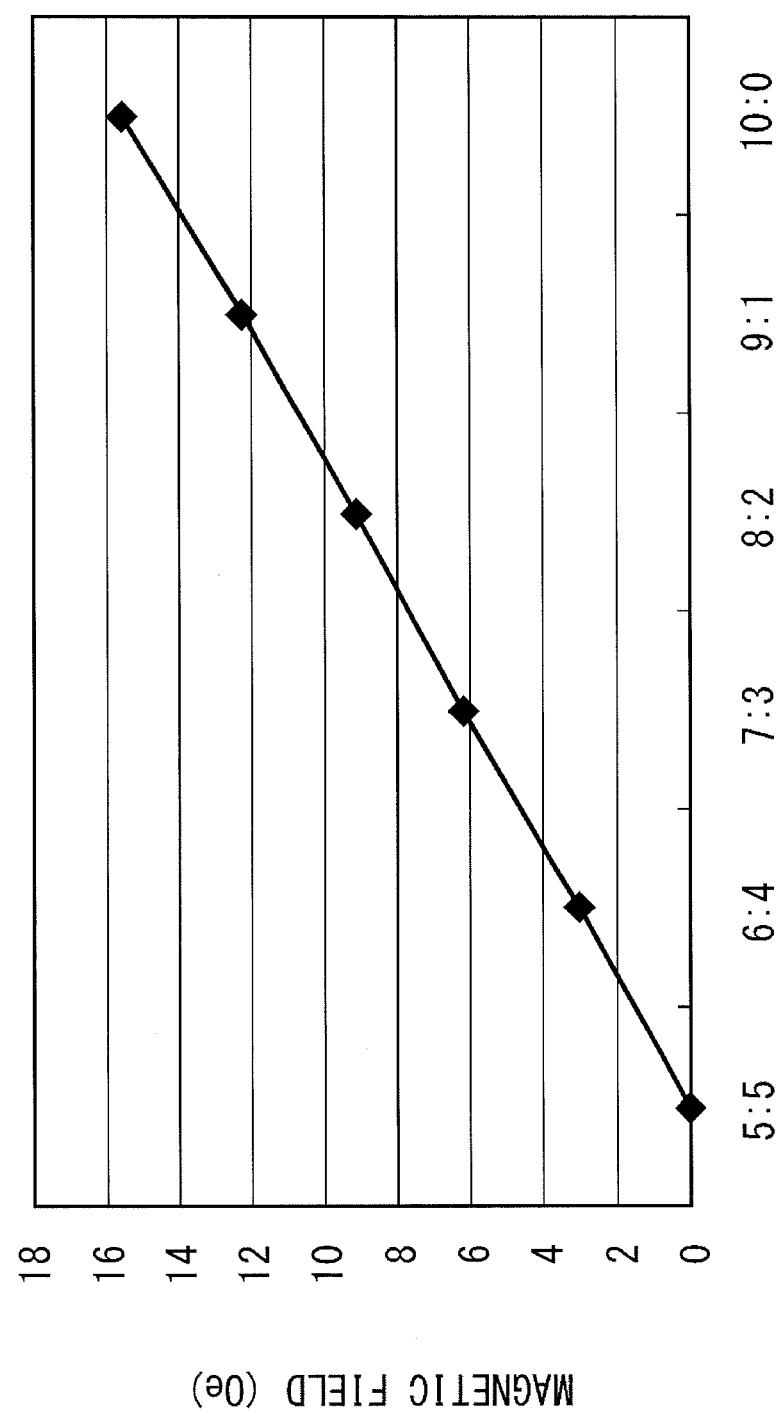
FIG. 32 is a drawing that shows magnetic field intensities relative to respective individual polarized ratios in the case when the spacing (CL) is set to 300 μm in the above-mentioned position detecting device.

Moreover, in the above-mentioned position detecting device 100, in the case when, on the assumption that the gap between the absolute track 11 and the increment track 12 in the scale unit 10 is set to 1 mm, the spacing (CL) is set to 300 µm, the results of magnetic field analyses carried out on the expansion of the magnetic field, that is, the amount of leakage of the magnetic field outside the recording tracks, are shown in FIG. 32.

In the above-mentioned position detecting device 100, as clearly indicated by the results of magnetic field analyses carried out, with the polarized ratio (effective section:invalid section) being changed between 5:5 to 10:0 in the region with the same continuously recorded information in the absolute track 11 of the scale unit 10, the value of the minimum magnetic field detected at the two ends of the detection region by the absolute pattern detection head 21 in the region with the same continuously recorded information in the scale unit 10 become virtually constant at any polarized ratios (effective section:invalid section) of 6:4 to 9:1, regardless of the spacings (CL=200 µm, 300 µm and 400 µm). Moreover, as the polarized ratio (effective section:invalid section) becomes greater, the resulting magnetic field intensity becomes greater. Furthermore, as the polarized ratio (effective section:invalid section) becomes greater, since the resulting state comes closer to the state of the long magnet, the leakage magnetic field outside the recording tracks becomes greater.

Therefore, since the magnetic field intensity of the absolute track 11 and the track-to-track distance relative to the increment track 12 form a trade-off relationship, it is possible to desirably determine the polarized ratio (effective section:invalid section) from the viewpoint of the actual use.

In the above-mentioned magnetic recording system, the polarized direction opposite to that of the effective section is given to all the invalid sections in the continuous recording unit; however, the present invention is not intended to be limited by this system. That is, it is not necessarily required to set the polarized direction in all the invalid sections to the opposite direction.

For example, the polarized direction opposite to that in the effective section may be given to every other invalid section in the continuous recording unit.

Figure 34:
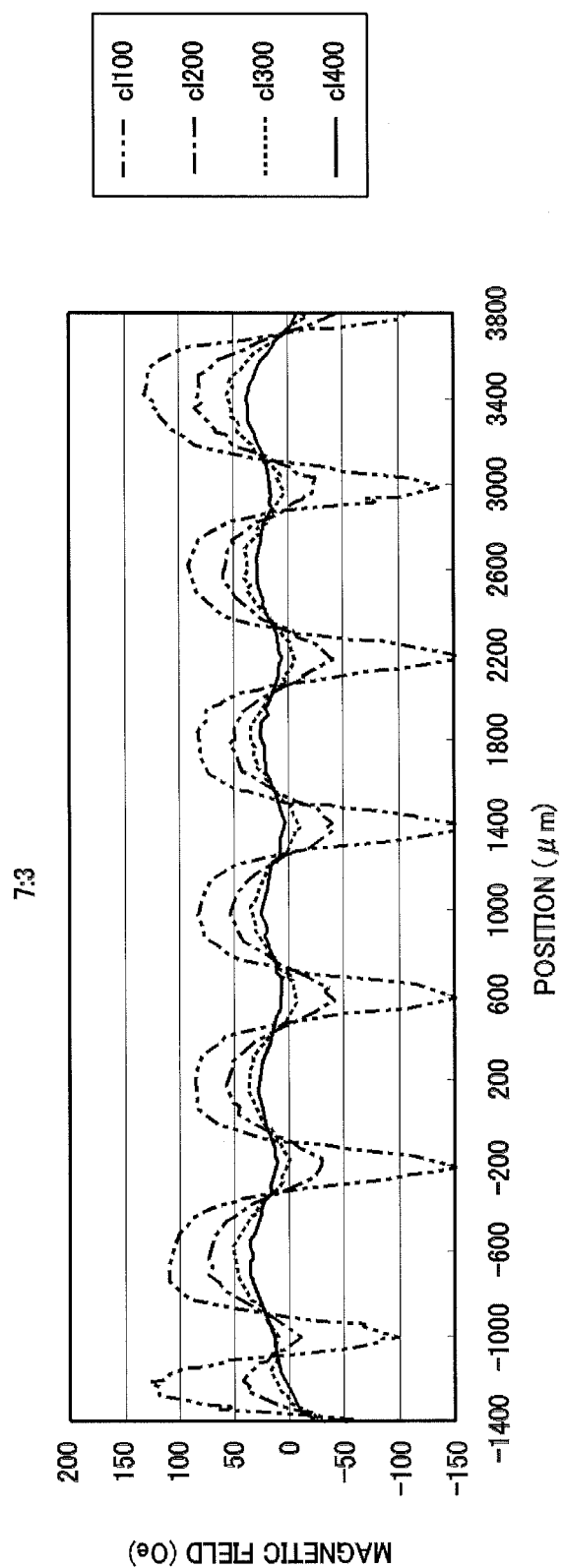
FIG. 34 is a drawing that shows an output magnetic field in continuous recording units of the respective spacings (CL=100 μm, 200 μm, 300 μm and 400 μm) obtained from a magnetic field analysis in which in the continuous recording units, an invalid section is placed as every other section with a polarized direction in a direction opposite to the polarized direction of an effective section, with the polarized ratio (effective section:invalid section) in the scale unit being set to 7:3, in the above-mentioned position detecting device.
Figure 35:
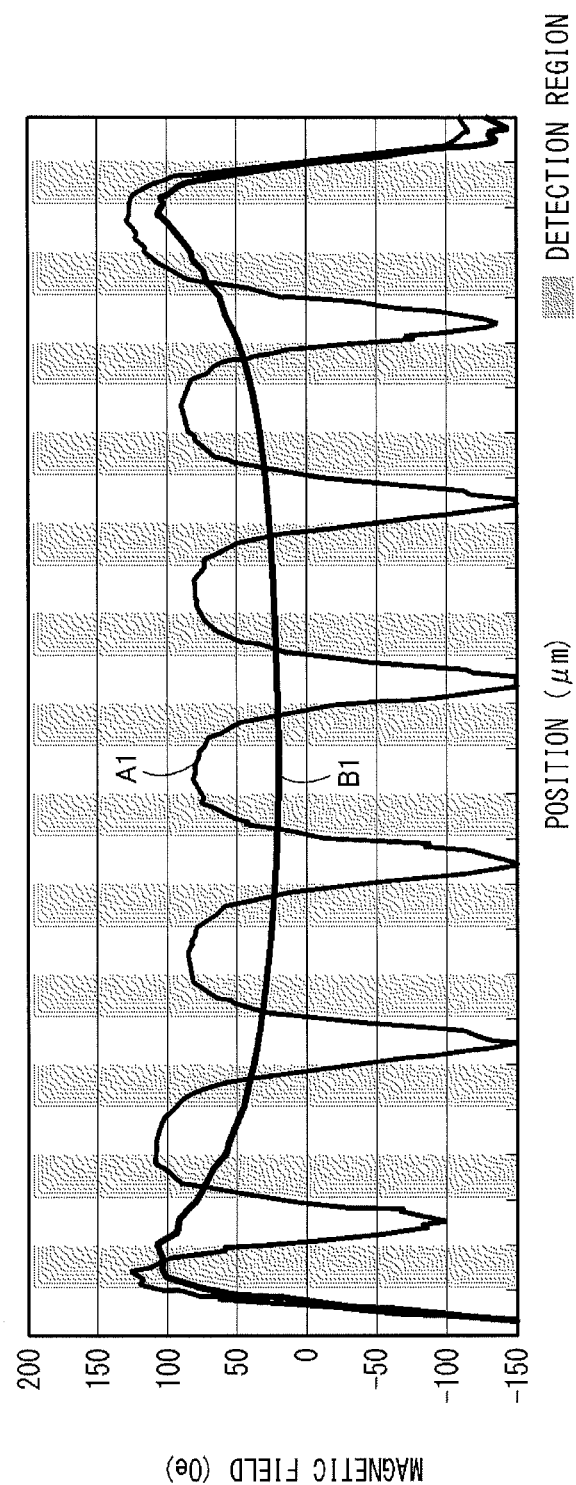
FIG. 35 is a drawing that shows a result of a magnetic field analysis on a state of a magnetic field detected by an absolute pattern detecting head in the case when the spacing (CL) is set to 100 μm, together with a result of a magnetic field analysis on a magnetic field in the case when the above-mentioned region with the same continuously recorded information is prepared as a long magnet.
Figure 36:
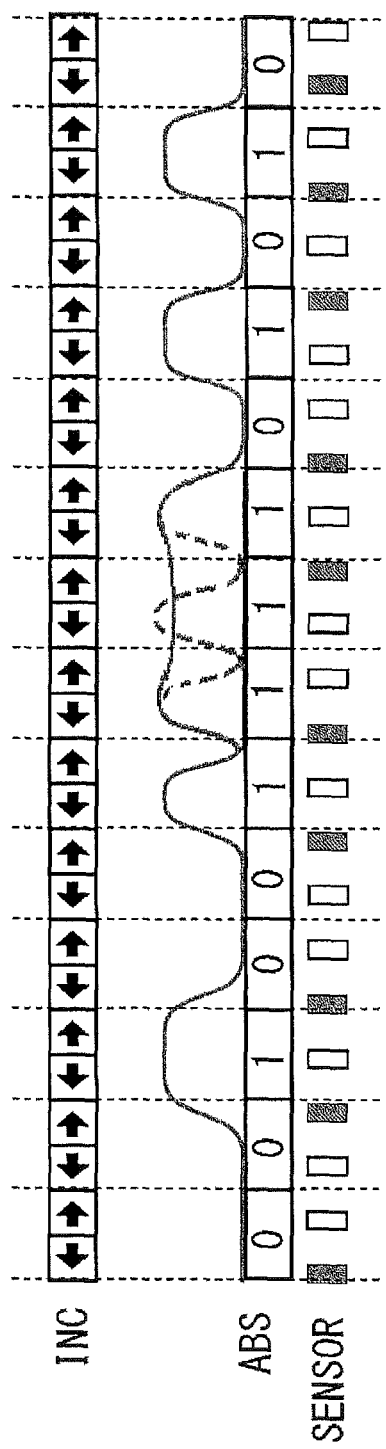
FIG. 36 is a schematic plan view showing a structural example of incremental (INC) tracks and absolute (ABS) tracks in a currently-used position detecting device.

FIG. 34 shows an output magnetic field in the continuous recording unit of each of the spacings (CL=100 µm, 200 µm, 300 µm and 400 µm) obtained from a magnetic field analysis in which in the continuous recording unit, an invalid section is placed as every other section with a polarized direction opposite to the polarized direction of the effective section, with the polarized ratio (effective section:invalid section) in the scale unit 10 being set to 7:3, in the position detecting device 100. Moreover, FIG. 35 shows the results of magnetic field analysis on a state of a magnetic field A1 detected by an absolute pattern detecting head 21 in the case when the spacing (CL) is set to 100 μm, together with the results of a magnetic field analysis on a magnetic field B1 in the case when the above-mentioned region with the same continuously recorded information is prepared as a long magnet in the above-mentioned position detecting device 100. Additionally, in FIG. 35, a region indicated by half-tone dot meshing corresponds to the detection region.

As clearly indicated by FIG. 35, in the above-mentioned position detecting device 100, the magnetic field A1 detected by the absolute pattern detection head 21 in the case of setting the spacing (CL) to 100 μm has a better detection output in its center portion in comparison with the magnetic field B1 in the case of using the long magnet.

Moreover, it becomes possible to obtain the same effects as those of the system which has all the non-detection units polarized in a reverse direction to that of the detection units, and has been described hereinabove. That is, it becomes possible to obtain a characteristic that is superior to the spacing characteristic of an alternative magnetic field with double frequency, and consequently to provide a stable signal within a range of 50% or more of one bit.

In the above-explained polarizing system, explanations have been given on a structure in which every other invalid section in the continuous recording units is polarized in a reverse direction to the polarized direction of the effective section; however, the position of the invalid section to be polarized in a reverse direction to that of the effective section is not limited by this structure. That is, every third invalid section may be polarized in an opposite direction, or another different pattern may be used. The position of the invalid section to be polarized in an opposite direction to the direction of the effective section is determined so as to allow the spacing characteristic and the minimum signal to have the greatest characteristics.

Moreover, in the above-explained polarizing system, explanations have been given to a case where the polarized ratio (effective section:invalid section) is set to 7:3; however, the polarized ratio is not limited by this ratio. That is, any polarized ratio (effective section:invalid section) between 5:5 to 10:0 may be adopted and the same characteristics can be obtained.

Figure 33:
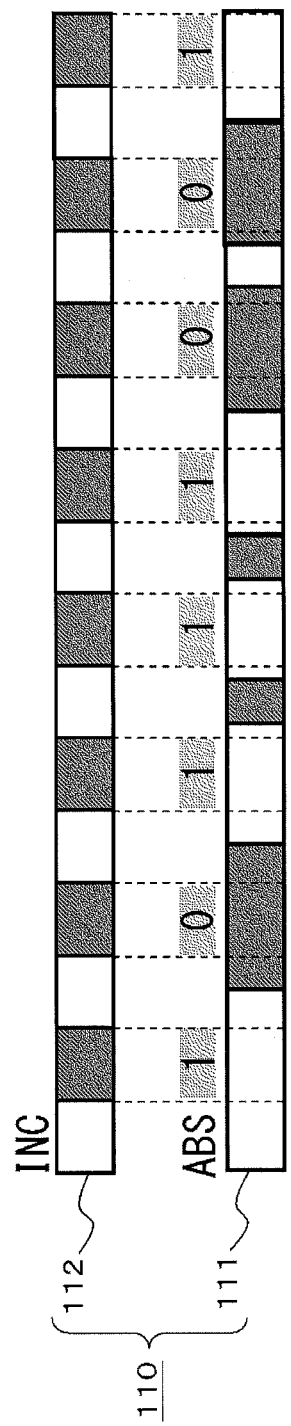
FIG. 33 is a schematic plan view showing a structural example of an optical scale to which the present invention is applied.

Additionally, in the embodiments of the present invention as explained above, the present invention is applied to the position detecting device 100 of a magnetic recording system; however, not limited only by the above-mentioned embodiment, but, for example, as shown in FIG. 33, the present invention may be applied to a position detecting device of an optical system that is provided with an optical scale 110 having a first recording track 111 in which non-repetitive signals composed of binary information are recorded and a second recording track 112 in which a signal for specifying a reading section within the section of information of 1 unit for the non-repetitive signal is recorded.

What is claimed is:

1. A position detecting device comprising:
  a recording medium provided with a first recording track in which a non-repetitive signal composed of binary information is recorded and a second recording track in which a signal for specifying a reading section within a section of information of 1 unit for the non-repetitive signal is recorded; and
  information reading means comprising a first detection head and a second detection head,
  wherein the information reading means reads each 1 unit information of the non-repetitive signal from the first recording track by using the first detection head in the reading section within a section of information of 1 unit for the non-repetitive signal specified based upon the signal recorded in the second recording track by the second detection head,
  wherein in the first recording track, each 1 unit information is recorded in an effective section longer than the reading section within the section of information of 1 unit for the non-repetitive signal, and
  wherein the first recording track is provided with an invalid section that records information different from the information recorded in the effective section and is located at a border portion between sections in which non-repetitive signals composed of the same binary information are continuously recorded.

2. The position detecting device according to claim 1, wherein the invalid section in which information different from the information in the effective section is recorded is shorter than the effective section.

3. The position detecting device according to claim 1, wherein the recording medium is a magnetic recording medium, and the information reading means detects a signal recorded in the first recording track and a non-repetitive signal recorded in the second recording track by using a magnetic detection head.

* * * * *